US012452317B2

(12) United States Patent
Shahmeer et al.

(10) Patent No.: US 12,452,317 B2
(45) Date of Patent: Oct. 21, 2025

(54) METHOD AND SYSTEM FOR TELECONFERENCING USING COORDINATED MOBILE DEVICES

(71) Applicant: Afiniti AI Limited, Dublin (IE)

(72) Inventors: Muhammad Shahmeer, Karachi (PK); Khubaib Ahmad, Lahore (PK); Muhammad Usman Bashir, Lahore (PK); Muhammad Abdullah Sajjad, Lahore (PK)

(73) Assignee: AFINITI AI LIMITED, Dublin (IE)

( * ) Notice: Subject to any disclaimer, the term of this patent is extended or adjusted under 35 U.S.C. 154(b) by 0 days.

(21) Appl. No.: 18/573,861

(22) PCT Filed: Jun. 24, 2022

(86) PCT No.: PCT/US2022/073156
§ 371 (c)(1),
(2) Date: Dec. 22, 2023

(87) PCT Pub. No.: WO2022/272304
PCT Pub. Date: Dec. 29, 2022

(65) Prior Publication Data
US 2024/0291872 A1  Aug. 29, 2024

(51) Int. Cl.
*H04L 65/403* (2022.01)
*H04L 65/1069* (2022.01)
(Continued)

(52) U.S. Cl.
CPC ........ *H04L 65/1069* (2013.01); *H04L 65/403* (2013.01); *H04L 65/70* (2022.05); *H04L 65/65* (2022.05)

(58) Field of Classification Search
CPC ... H04L 65/1069; H04L 65/403; H04L 65/65; H04L 65/70
(Continued)

(56) References Cited

U.S. PATENT DOCUMENTS

| 10,999,227 | B1 * | 5/2021 | Yan | H04L 51/046 |
| 2015/0117674 | A1 * | 4/2015 | Meachum | H04L 65/4038 381/94.1 |
| 2016/0014373 | A1 * | 1/2016 | LaFata | H04M 9/082 348/14.08 |

FOREIGN PATENT DOCUMENTS

| GB | 2605565 A * | 10/2022 | H04L 12/1813 |
| WO | WO 2021119090 | 6/2021 | |

OTHER PUBLICATIONS

Extended European Search Report in European Appln. No. 24172654.6, mailed on Jun. 11, 2024, 10 pages.
(Continued)

*Primary Examiner* — Glenford J Madamba
(74) *Attorney, Agent, or Firm* — Rothwell, Figg, Ernst & Manbeck, P.C.

(57) ABSTRACT

A method of setting up a teleconferencing system using mobile devices is disclosed. Participants with mobile devices in multiple rooms may communicate based on the disclosed teleconferencing application executed on the mobile devices. Each room has one of the mobile devices designated as a leader device for that room. The leader devices may communicate using VoIP over the Internet. Other mobile devices in a room are designated as client devices associated with the leader devices. Participants operating the client devices can talk to other participants in that room and the other rooms through the client device communicating through the leader device of the room. The leader device synchronizes the playing of received audio between all of the client devices in the room. The leader device includes a selection algorithm that selects one of the devices to act as the microphone for audio signals generated in the room.

20 Claims, 16 Drawing Sheets

(51) Int. Cl.
*H04L 65/70* (2022.01)
*H04L 65/65* (2022.01)

(58) Field of Classification Search
USPC .......................................................... 709/204
See application file for complete search history.

(56) References Cited

OTHER PUBLICATIONS

International Preliminary Report on Patentability in International Appln. No. PCT/US2022/073156, mailed on Jan. 4, 2024, 10 pages.
International Search Report and Written Opinion in International Appln. No. PCT/US2022/073156, mailed on Oct. 11, 2022, 15 pages.

* cited by examiner

METHOD AND SYSTEM FOR TELECONFERENCING USING COORDINATED MOBILE DEVICES

CROSS-REFERENCE TO RELATED APPLICATIONS

This application is a national phase entry of PCT Application No. PCT/US2022/073156, filed on Jun. 24, 2022, which claims the benefit of U.S. Provisional Patent Application No. 63/202,796, filed on Jun. 24, 2021, the entirety of which is incorporated by reference herein.

TECHNICAL FIELD

The present disclosure relates generally to communication systems. More particularly, aspects of this disclosure relate to an application that allows a room-to-room communication system to be set up using mobile devices.

BACKGROUND

Teleconferencing has recently taken on greater importance, especially with the advent of the COVID-19 pandemic. Traditional teleconferencing has involved using a telephone system with specialized hardware for participants in different rooms. However, changes in the accessibility of video streaming and the Internet have changed the fundamental infrastructure for teleconferences. For example, the world is shifting itself from GSM and PSTN to Voice over Internet Protocol (VoIP)-based systems. VoIP has drastically reduced the cost of communication by sharing network infrastructure between data and voice. Some VoIP services are free. This model allows users to download software application to a computing device. Such software allows low-cost calls to be made to other service users, and even, in some cases, placing domestic calls to landline phones and cell phones without charge.

The recent advances have not been integrated into teleconferencing such as situations where there are several participants in a room communicating with another remote group. In such cases, traditional telephone systems often must be used as different VoIP-based systems are incompatible with each other and thus cannot be reliably deployed among different groups of participants. For example, several people may be crowded around a single mobile phone or speakerphone in one room to facilitate a teleconference with remote participants.

Thus, there is a need for a user device application that allows the establishment of an ad hoc teleconferencing system between participants in different locations. There is a further need for the establishment of communication between devices in a room and communication with external devices through the establishment of a leader device. There is a further need for a routine to select a single audio stream from multiple audio streams in a room for communication to an external device.

SUMMARY

One disclosed example is a method for establishing a teleconferencing system between two locations. A first signal is transmitted between a leader communication device and a client communication device. Each communication device includes a network communication transceiver, a speaker and a microphone. A first audio input is received at the leader device generated from an audio source. The first audio input is parsed into a first plurality of audio packets. A second audio input is received at the client device generated from the audio source. The second audio input is parsed into a second plurality of audio packets. A first metric of at least one first audio packet in the first plurality of audio packets is determined via the leader device. A second metric of at least one second audio packet in the second plurality of audio packets is determined via the leader device. It is determined whether the first metric is greater than the second metric. At least one first audio packet in the first plurality of audio packets and a predetermined number of remaining audio packets in the first plurality of audio packets are transmitted to a remote device based on determining that the first metric is greater than the second metric.

A further implementation of the example method is an embodiment where the method further includes transmitting the at least one second audio packet in the second plurality of audio packets and a predetermined number of remaining audio packets in the second plurality of audio packets to the remote device based on determining that the first metric is not greater than the second metric. Another implementation is where the example method includes receiving a visual signal from the remote device; and outputting the visual signal on displays of the first device and the second device. Another implementation is where the transmitting to the remote device is performed using a voice over Internet protocol through the Internet. Another implementation is where the example method further includes receiving a second signal from the remote device and outputting a third audio signal at the leader communication device based on the second signal. The method also includes outputting a fourth audio signal at the client device based on the second signal, wherein the fourth audio signal is phase shifted from the third audio signal. Another implementation is where the second signal comprises an audio signal. Another implementation is where each of the leader communication device and the client communication device are smart phones. Another implementation is where transmitting a first signal between a leader communication device and a client communication device further comprises the client communication device establishing network communication with the leader communication device through receiving network information through a visual indicator displayed by the leader communication device. Another implementation is where transmitting a first signal between a leader communication device and a client communication device further comprises the client communication device establishing network communication with the leader communication device through receiving network information through a wireless communication. Another implementation is where the first metric is based on an average energy of the at least one audio packet. Another implementation is where the first signal comprises a transmission using a Web RTC data channel. Another implementation is where transmitting the at least one first audio packet in the first plurality of audio packets and a predetermined number of remaining audio packets in the first plurality of audio packets to a remote device comprises a transmission using a WebRTC audio channel. Another implementation is where the first signal comprises a first frequency. Another implementation is where the example method further includes transmitting a second signal comprising a second frequency between the leader communication device and the client communication device; and syncing the leader communication device and the client communication device based on at least one of the first signal and the second signal.

Another disclosed example is a method of setting up a teleconferencing system between a plurality of mobile devices in a room. A network communication channel is established between a first mobile device of the plurality of mobile devices and a second mobile device of the plurality of mobile devices. The first mobile device is designated as a leader device. The second mobile device is designated as a client device. A Voice over Internet Protocol communication from a remote device to the first mobile device is received through the Internet. The Voice over Internet Protocol communication from the first mobile device is transmitted to the second mobile device. The Voice over Internet Protocol communication is played on the first mobile device and the second mobile device.

A further implementation of the example method is an embodiment where the network communication between the first and second mobile devices is established through receiving network information through a visual indicator displayed by the first mobile device. Another implementation is where the network communication between the first and second mobile devices is established through receiving network information through a wireless communication from the first mobile device. Another implementation is where the example method further includes synchronizing the first mobile device and second mobile device to synchronize the playing of the received communication from the remote device.

Another disclosed example is a non-transitory computer-readable storage medium including instructions that, when executed by at least one processor of a first mobile device, cause the first mobile device to perform operations including establishing a network communication channel between a second mobile device and the first mobile device. The operations include designating the first mobile device as a leader device; and designating a second mobile device as a client device. The operations include receiving a Voice over Internet Protocol communication from a remote device through the Internet. The operations include sending the communication from the remote device to the second mobile device with instructions to play the communication at a selected time. The operations include playing the communication from the remote device on the first mobile device in synchronization with the selected time.

Another disclosed example is a teleconferencing system for participants in a room. The system includes a first mobile device receiving a voice over Internet Protocol communication from a remote device through the Internet. The first mobile device is designated as a leader device. A second mobile device is designated as a client device by establishing network communication channel with the first mobile device. The first mobile device is configured to send the communication from the remote device to the second mobile device. The first and the second mobile devices are configured to play the received communication from the remote device.

Another disclosed example is a mobile device for setting up a teleconferencing system. The mobile device includes a microphone; a speaker; a network interface; and a processor coupled to the microphone, speaker, and network interface. The processor is configured to receive a Voice over Internet Protocol communication from a remote device via the network interface. The processor is configured to establish a communication with a second mobile device in the room. The processor is configured to send the communication from the remote device to the second mobile device. The processor is configured to play the received communication from the remote device on the speaker in synchronization with the second mobile device playing the received communication.

In another general aspect, a method comprises: transmitting, by a leader communication device, a first signal between the leader communication device and a client communication device, wherein the leader communication device and the client communication device each includes a network communication transceiver, a speaker, and a microphone; generating, by the leader communication device, first audio data based on audio input from an audio source; dividing, by the leader communication device, the first audio data into a first plurality of audio packets; receiving, by the leader communication device, a second plurality of audio packets from the client communication device, wherein the second plurality of audio packets include second audio data that the client communication device generated based on audio input from the audio source; determining, by the leader communication device, a first metric for at least one audio packet in the first plurality of audio packets; determining, by the leader communication device, a second metric for at least one audio packet in the second plurality of audio packets; comparing, by the leader communication device, the first metric with the second metric; and transmitting, by the leader communication device, a set of audio packets to a remote device, wherein the set of audio packets is selected based on the comparison of the first metric with the second metric to include (i) the at least one audio packet in the first plurality of audio packets and a predetermined number of additional audio packets in the first plurality of audio packets or (ii) the at least one audio packet in the second plurality of audio packets and the predetermined number of additional audio packets in the second plurality of audio packets.

Implementations can include one or more of the following features. For example, in some implementations, the method comprises determining that the first metric is greater than the second metric, and transmitting the set of audio packets comprises transmitting at least one audio packet in the first plurality of audio packets and the predetermined number of additional audio packets in the first plurality of audio packets to the remote device based on determining that the first metric is greater than the second metric.

In some implementations, the method comprises determining that the first metric is not greater than the second metric, and transmitting the set of audio packets comprises transmitting at least one audio packet in the second plurality of audio packets and the predetermined number of additional audio packets in the second plurality of audio packets to the remote device based on determining that the first metric is not greater than the second metric.

In some implementations, the method comprises: receiving a visual signal from the remote device; and outputting the visual signal on displays of the leader device and the client device.

In some implementations, the transmitting to the remote device is performed using a voice over Internet protocol through the Internet.

In some implementations, the method comprises: receiving a second signal from the remote device; outputting a third audio signal at the leader communication device based on the second signal; and outputting a fourth audio signal at the client device based on the second signal, wherein the fourth audio signal is phase shifted from the third audio signal.

In some implementations, the second signal comprises an audio signal.

In some implementations, each of the leader communication device and the client communication device are smart phones.

In some implementations, transmitting the first signal between the leader communication device and the client communication device further comprises establishing, by the leader communication device, network communication with the client communication device based on the client communication device receiving network information through a visual indicator displayed by the leader communication device.

In some implementations, transmitting a first signal between a leader communication device and a client communication device further comprises establishing network communication, by the leader communication device, with the client communication device based on the client communication device receiving network information through a wireless communication.

In some implementations, the first metric is based on an average energy of the at least one audio packet.

In some implementations, the first signal comprises a transmission using a Web RTC data channel.

In some implementations, transmitting the at least one first audio packet in the first plurality of audio packets and a predetermined number of remaining audio packets in the first plurality of audio packets to a remote device comprises a transmission using a WebRTC audio channel.

In some implementations, the first signal comprises a first frequency.

In some implementations, the method comprises: transmitting a second signal comprising a second frequency between the leader communication device and the client communication device; and syncing the leader communication device and the client communication device based on at least one of the first signal and the second signal.

In some implementations, the method comprises obtaining, by the leader communication device, a code for a call or conference that includes communication over a network between the leader communication device and at least one other leader communication device. Transmitting the first signal comprises providing, by the leader communication device, output of the code. The method further comprises, after providing output of the code, enabling participation of the client communication device in the call or conference in response to a communication that the client communication device provides based on the code, such that the leader communication device receives audio data recorded by the client communication device and the leader communication device provides audio data from the at least one other leader communication device to the client communication device.

In some implementations, the code identifies (i) the call or conference and (ii) a room, from among multiple rooms involved in the call or conference, that corresponds to the leader communication device.

In some implementations, the code is an optical machine-readable code.

In some implementations, the code is a quick response (QR) code.

In some implementations, the method comprises: maintaining, by the leader communication device, communication with each of multiple remote devices that are concurrently involved in a call or conference; receiving, by the leader communication device, audio data from each of the remote devices; mixing, by the leader communication device, the received audio data of the multiple leader devices; and providing, by the leader communication device, the mixed audio data to the client communication device.

In some implementations, the audio packets in the first plurality of audio packets are assigned sequence numbers and the audio packets in the second plurality of audio packets are assigned sequence numbers; wherein the method further comprises correlating the sequence numbers of the first plurality of audio packets and second plurality of audio packets; and wherein the at least one audio packet of the first plurality of audio packets and the at least one audio packet of the second plurality of audio packets are selected based on the correlation of the sequence numbers.

In some implementations, the first metric is a measure of clarity of the at least one audio packet of the first plurality of audio packets; wherein the second metric is a measure of clarity of the at least one audio packet of the second plurality of audio packets; and wherein the method comprises determining, by the leader communication device, whether to select the set of audio packets to transmit to the remote device from the first plurality of audio packets or the second plurality of audio packets based on which of the first metric and the second metric indicates greater clarity.

In some implementations, determining the first metric comprises determining the first metric based on a series of multiple audio packets from the first plurality of audio packets that encode audio occurring over a period of time; determining the second metric comprises determining the second metric based on a series of multiple audio packets from the second plurality of audio packets that encode audio occurring over the period of time; and the predetermined number of audio packets is greater than a number of audio packets evaluated to determine the first metric or the second metric.

In some implementations, the leader communication device is located in a room, and the leader communication device is configured to perform a series of evaluations of streams of audio packets from multiple devices in the room and is configured to vary which of the streams is transmitted to the remote device based on results of the evaluations. Each of the evaluations comprises (i) generating metrics for audio packets of the respective streams that correspond to an evaluation period of time having a predetermined duration and (ii) selecting one of the streams based on the metrics. For each of the evaluations, the leader communication device is configured to transmit, to the remote device, a contiguous sequence of packets from the selected stream including (i) the audio packets of the selected stream that correspond to the evaluation period of time and (ii) additional audio packets of the selected stream that represent a predetermined duration of time following the end of the evaluation period of time.

In some implementations, the predetermined duration of time is greater than the evaluation period of time.

In some implementations, the method further comprises synchronizing playback audio data received by the leader communication device from the remote device over the network with playback of the audio data by one or more other remote devices.

Other embodiments of these and other aspects discussed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1A:
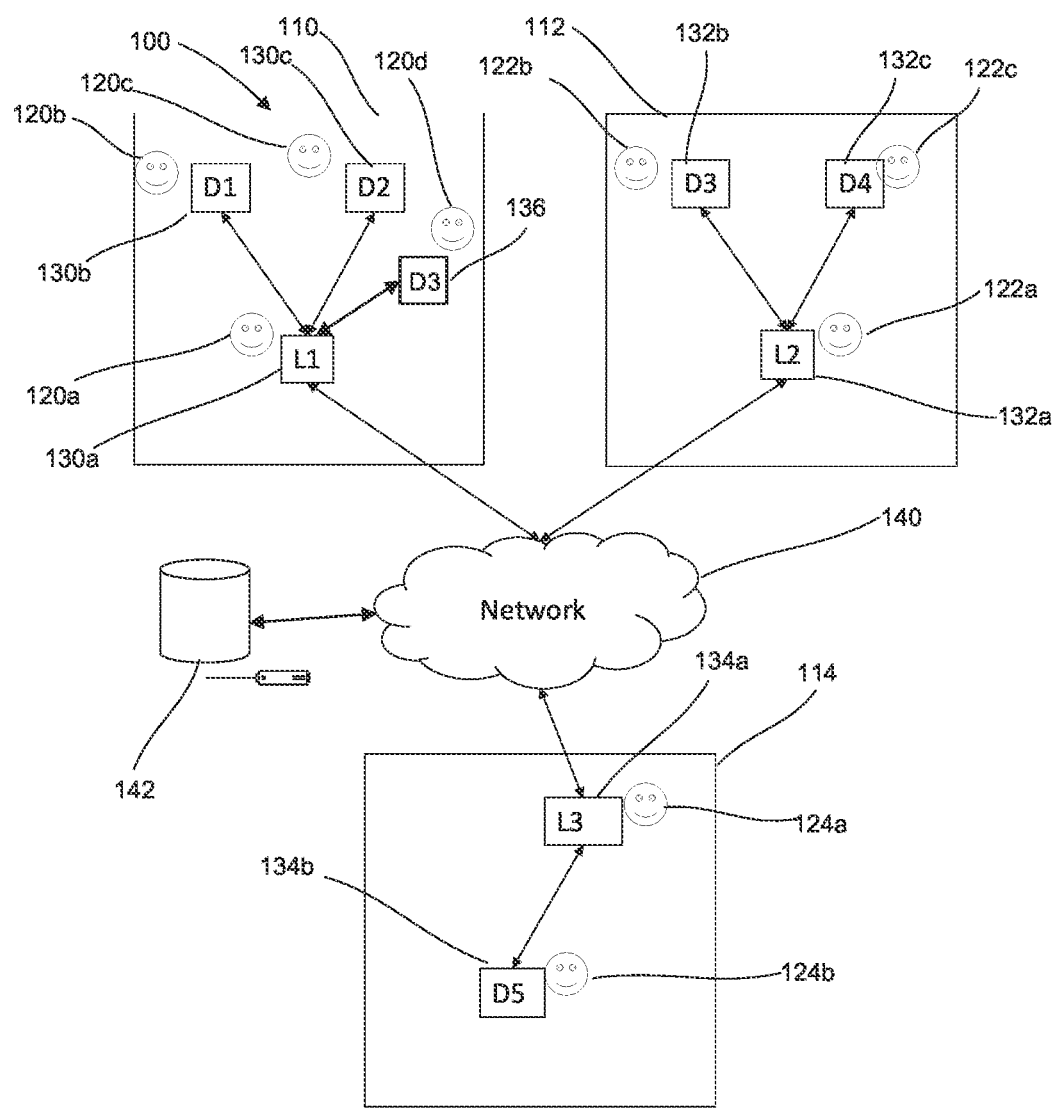
FIG. 1A is a diagram of an ad hoc teleconferencing system set up between mobile user devices of participants in multiple rooms.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward providing an online teleconferencing solution, through which all user devices of a meeting room can join all the user devices of another remote meeting room. The example system is based on a VoIP mobile application available for different operating systems such as Apple iOS or Google Android. The system allows the integration of more traditional telephone systems such as GSM or PSTN, and the presently-disclosed system allows the integration of other VoIP applications.

The example system is a mobile application that provides a conferencing solution for multiple participants in different rooms through individual mobile user devices. The example mobile application and associated infrastructure provides room-to-room communication, which is a seamless conferencing solution free of specialized hardware, requiring only mobile user devices. The example system may replace conventional desk phones and "star phones" (e.g., Polycom speakerphones) in conference rooms. Each participant's mobile user device provides a microphone and a speaker, replacing the microphone and speaker of a known star phone. The example mobile application includes speaker microphone selection, synchronization in playout, noise cancelation, automatic gain control based on a calculated factor, acoustic echo cancellation, and QoS (Quality of Service) Settings to handle priority of VoIP Packets, e.g., DSCP (Differentiated Service Code Point) for audio signals. The mobile application allows the setup of a single leader device from one of the mobile user devices in a room. The other mobile devices in the room are associated as client devices to the leader device, which communicates over a communication network (e.g., the Internet) with one or more other leader devices located in other rooms. Each leader device receives and processes local audio data (e.g., audio recorded in its own room), and distributes the processed audio data over the network to the other leader devices in the conference. Each leader device also receives and processes the remotely-recorded audio data provided by the other leader devices, and distributes audio data among the client devices in its room for synchronized playback. The communication among the leader devices provides the exchange of data needed to establish and maintain a conference among multiple rooms that each have multiple participating devices.

One example of the described principles is the CONFU product. The example ad hoc teleconferencing system provides a seamless solution that replaces conventional desk phones, star phones, or other specialized hardware in a conference room. The system provides an integrated sound localization scenario and gives participants a smooth audio-conferencing experience in a multi-room scenario.

FIG. 1A is a block diagram of an example communication system 100 that may be established between participants in different rooms 110, 112, and 114. The system 100 allows conference communication between participants in two or more physically separated rooms, and three such rooms 110, 112, and 114 are shown in the illustrated example. Each of the rooms 110, 112 and 114 includes multiple participants such as participants 120*a*, 120*b*, 120*c*, and 120*d* in room 110; participants 122*a*, 122*b*, 122*c* in room 112; and participants 124*a* and 124*b* in room 114. Each of the participants has access to a mobile user device that is operable for communication that allows them to participate in a teleconference with the other participants in the system 100. In this example, the user devices include mobile devices 130*a*-130*c* such as smartphones corresponding to participants 120*a*-120*c*; mobile devices 132*a*-132*c* such as smartphones corresponding to participants 122*a*-122*c*; and mobile devices 134*a*-134*b* such as smartphones corresponding to participants 124*a*-124*b*. Other computing devices 136 equipped with microphones or speakers (e.g., tablets or laptops) may be used by a participant such as participant 120*d*.

The example application is installed on each of the mobile user devices 130*a*-130*c*, 132*a*-132*c*, and 134*a*-134*b* through conventional means such as downloading the application via the Cloud (e.g., from the Apple App Store or the Google Play store). When each mobile device 130*a*-130*c*, 132*a*-132*c*, and 134*a*-134*b* accesses the example application, the example application may offer links corresponding to available conference rooms to the mobile device. The mobile device can request to join one of the conference rooms, for example, by a user clicking on a link associated with that conference room. In some examples, the example application identifies conference rooms as available based on a geographic proximity of the conference room to the mobile device or based on an invite list of the conference room which includes either the mobile device or information associated with a user of the mobile device. In some examples, a mobile device, which is already associated with a conference room, has a QR code and an NFC joining capacity on the user interface generated on the display of the mobile device by the example application. As discussed further below regarding FIG. 5, other prospective participants may scan the QR code via their respective mobile devices or just tap on the mobile device, which is already associated with a conference room, to activate the NFC joining capacity to get into the meeting. In some examples, the example application may create a new conference room associated with the mobile device. It is also understood that the "conference room" need not be a physical room; it can be any space in which one or more mobile devices using the example application in proximity with one another may coordinate with each other for a teleconference. Accordingly, the example application provides a centralized seamless conferencing solution to cater to conventional conferencing needs for the participants.

In this example, multiple participants 120*a*-120*d* are present in the first room 110, multiple participants 122*a*-122*c* are present in the second room 112, and multiple participants 124*a*-124*b* are present in the third room 114. The room 112 is physically separated from the rooms 110, 114 and thus may be in the same building or a geographically remote location that has network communication (e.g., cellular or Wi-Fi connections to the Internet) with the mobile devices in the rooms 110, 114. Although three total rooms 110, 112, and 114 are depicted in system 100, the present disclosure contemplates that a system in accordance with the present disclosure can have any number of rooms. Although rooms 110, 112, and 114 are depicted with two to four participants, the present disclosure contemplates that each room 110, 112, and 114 can have any number of participants. Further, for the purposes of the present disclosure, mobile devices that are within the same room are referred to as 'local to each other,' while mobile devices that are in different rooms from each other are referred to as 'remote from each other.'

Each room 110, 112, and 114 has a leader device. The leader device in each room, once selected, transmits all communication from that room to the other rooms in system 100 and receives all communication from the other rooms in system 100.

In one example, a mobile device makes a call from a first room (e.g., room 110) to at least one second room (e.g., rooms 112 and/or room 114). In this example, the mobile device which made the call becomes the leader device for that room.

In another example, the mobile devices in each room exchange information with each other to determine which mobile device will be a leader device for said room. For example, the mobile devices 130*a*-130*c* exchange information with each other mobile device in room 110 to determine a preferred leader. In some examples, the mobile device of mobile devices 130*a*-130*c* that has the highest processing power is selected as the leader device. In some examples, a mobile device is selected as the leader device based on any of: a battery charge level, a strength of wireless connectivity, processing power, mobile RAM, or other characteristics of the mobile device.

In some examples, the "leader" status of one mobile device may be handed off to a different mobile device during a teleconference, which becomes the new leader device. The handoff may be in response to one of the aforementioned characteristics or metrics, such as a change in relative battery charge level between the two mobile devices.

For example, in room 110, the mobile device 130*a* is selected as the leader device. Therefore, the mobile device 130*a* transmits communication from any of the mobile devices 130*a*-130*c* and computing device 136 to the rooms 112 and 114. The other devices such as the mobile devices 130*b*, 130*c* and the computing device 136 become client devices associated with the leader device 130*a*. For example, in room 112, the mobile device 132*a* is selected as the leader device. Therefore, the mobile device 132*a* transmits communication from any of the mobile devices 132*a*-132*c* to rooms 110 and 114. The other mobile devices 132*b*, 132*c* become client devices associated with the leader device 132*a*. For example, in room 114, the mobile device 134*a* is selected as the leader device. Therefore, the mobile device 134*a* transmits communications from the mobile device 134*b* to rooms 110 and 112. The other mobile device 134*b* becomes a client device associated with the leader device 134*a*.

In some examples, one participant uses their mobile device (e.g., the participant associated with the leader device) to call from one of the rooms 110, 112, 114 to either (1) another participant in a different room, or (2) a different room in the system. In some examples, the example application is configured to communicatively connect pre-selected rooms based on information from a participant before the call began (e.g., all rooms 110, 112, 114 in system 100 are configured to be connected). In all examples, communication between rooms in the system is referred to as a 'call'.

The call may be initiated using a VoIP, SIP, or similar standard or proprietary protocol for communication over a data network. Communication is established between the room 110 and the room 112 through the leader devices 130a and 132a in this example via external network protocol communication through a network 140 such as the Internet. As will be explained, all the participants in the room 110 can communicate with all the participants in the room 112 and vice versa. The leader devices 130a and 132a share information NTS tokens, corresponding room identification information for each leader device, and meeting identification information using a backend service such as a Google Firebase cloud database 142 via the network 140. Similarly, to the established communication between rooms 110 and 112, communication is established between all remaining rooms in system 100 (e.g., communication is established between rooms 110 and 114, and between rooms 112 and 114).

Figure 1B:
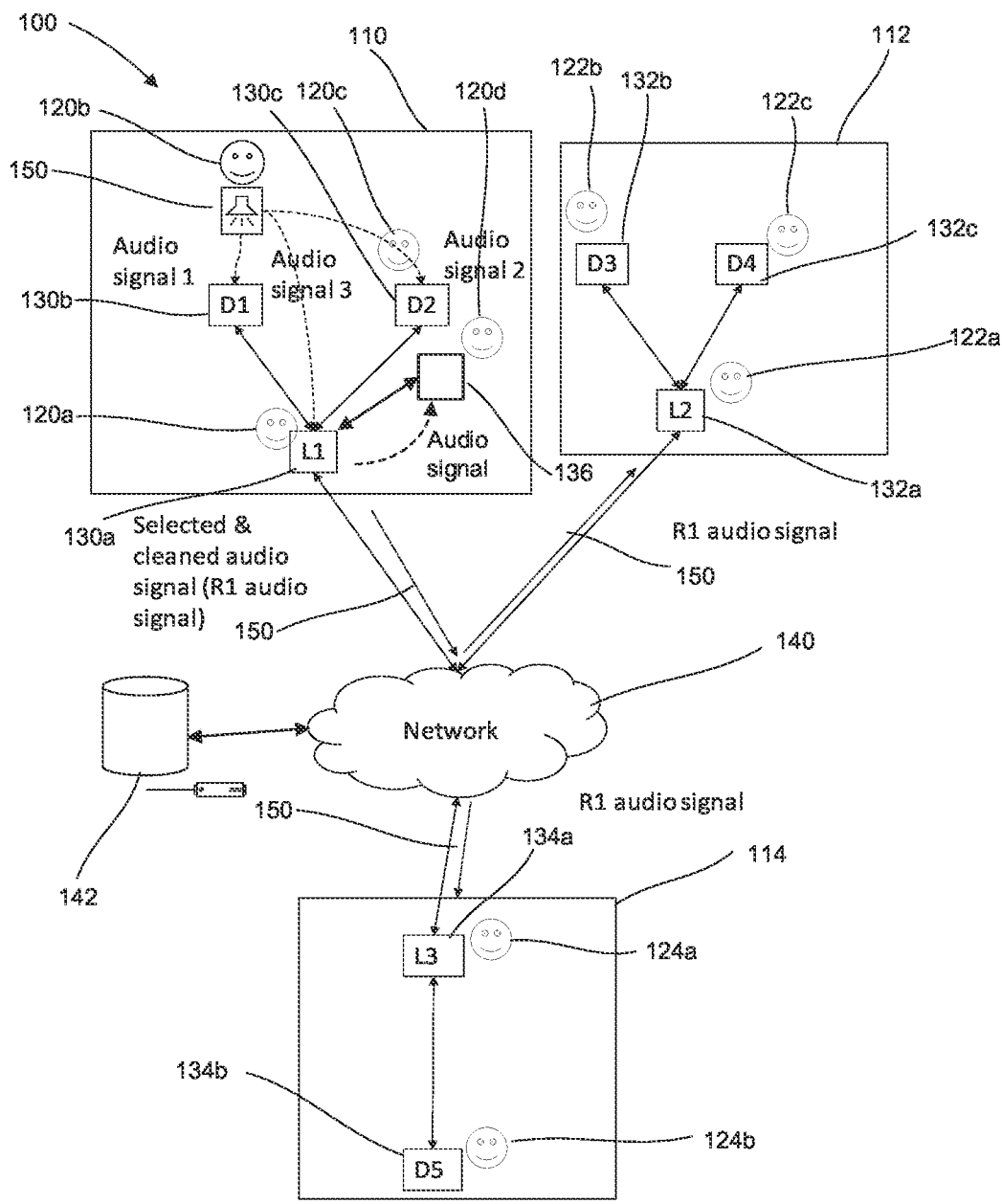
FIG. 1B is a diagram of the communication of an audio signal in the system in FIG. 1A.

FIG. 1B shows an exemplary path of audio communication where an audio signal from room 110 is transmitted to rooms 112 and 114. FIG. 1B demonstrates that, according to embodiments of the present disclosure, a leader device in one room receives audio signals from the other leader device in the other rooms. For example, each audio signal is transmitted in a series of packets as discussed further below. Each leader device transmits the received audio signal to the client devices associated with said leader device. The leader device directs all mobile devices in a single room to play the received audio signal in synchronization on all the mobile devices in the room.

The communication between the leader devices, such as mobile devices 130a and 132b in FIG. 1B, occurs over the Internet 140. In some examples, communication among the leader device, such as mobile device 130a, and the client devices, the other mobile devices 130b-130d in a single room such as the room 110 is through an ad hoc network established in a structured grid. For example, the leader device can communicate with client devices in the same room using a short-range wireless communication channel, such as Bluetooth or another direct, device-to-device radiofrequency communication link. As another example, the leader device may communicate with client devices using Wi-Fi. The mobile devices of one room can be connected on the same internet connection, i.e., a Wi-Fi router or mobile hotspot.

When one of the participants in room 110 speaks (e.g., participant 120b as shown in FIG. 1B), microphones at each of the devices receive and record an audio signal. For example, mobile device 130b records audio signal 1, mobile device 130c records audio signal 2, mobile device 130a records audio signal 3, and traditional telephone records audio signal 4. Therefore, audio signals 1, 2, 3, and 4 all capture the audio generated by the participant 120b. However, the recorded audio signals 1, 2, 3, and 4 may differ from each other, for example, based on (1) a sensitivity of the microphone at each mobile device, (2) a time delay of a mobile device receiving the audio signal according to a position of the mobile device in the room, or (3) whether the audio signal encountered interference before being recorded by a mobile device. For example, the mobile device 130a is further from the participant 120b than the mobile device 130b, and accordingly, the recorded audio signal 3 will have a time delay from recorded audio signal 1. For example, the mobile device 130b may have a better microphone than the computing device 136, and, accordingly, audio signal 1 has better clarity than audio signal 4. For example, there may be furniture or other physical barriers between the participant 120b and the mobile device 130a, and, accordingly, recorded audio signal 3 may have low clarity. For example, the audio signal from the participant 120b may echo off the edges of the room 110, and the mobile device 130a may record both the direct audio signal from the participant 120b and the echoed audio signal, which results in audio signal 3 having low clarity.

Each device 130b, 130c, and 136 transmits its recorded audio to the leader device 130a. The example application executed in the leader device 130a thus selects one of the recorded audio signals 1, 2, 3, 4 to transmit to other rooms in the system 100. The example application selects the audio signal from each of the devices 130a-130c and 136 based on which audio signal has the best metrics. For example, the example application evaluates which audio signal 1, 2, 3, 4 is the clearest and/or the loudest. In some examples, the recorded audio signal selected by the example application is received from a device which is physically closest to the speaker, e.g., participant 120b. For example, the leader device 130a cleans the audio signal and sends a cleaned audio signal 150 to the leader phones 132a and 134a via the network 140 where the cleaned audio signal 150 is in turn transmitted to all the client devices in the respective rooms 112 and 114.

The example system includes two basic features of (1) a conference mode, as discussed above regarding FIG. 1B, and (2) a party mode. In the party mode, the leader device of each room receives a signal, and coordinates playout at each other device in the room. For example, in party mode, a video with both audio and visual data is synchronously played out at each device in each room.

The conference mode has two types of communication. One of the types of communication is from a mobile device designated as a leader device in a first room to another mobile device designated as a leader device in a second room. The other type of communication is ad hoc between the mobile device designated as the leader device and the other mobile devices in the room that are designated as client phones. In this example, a Web real time communication (WebRTC) system provides the basic platform for the communication. The example system adds certain extra modules to the WebRTC to meet the requirements for the operational teleconferencing features described herein.

In this example, the network 140 allows communication between any of the user devices in FIG. 1A. The mobile user devices are accessible by the participants and run the example teleconferencing application to allow teleconferencing to be set up without previous teleconferencing hardware. The mobile user devices may include virtually any preferably mobile computing device equipped with a microphone and speaker that is configured to send and receive information over a wireless capable network, such as the network 140.

The network 140 is configured to allow communications between one computing device with another computing device. The network 140 may be enabled to employ any form of computer readable media for communicating information from one electronic device to another. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines; full or fractional dedicated digital lines including T1, T2, T3, and T4; Integrated Services Digital Networks (ISDNs); Digital Subscriber Lines (DSLs); wireless links including satellite links; or other communication links known to those of ordinary skill in the art. Furthermore, remote computers and other related electronic devices can be remotely connected to either LANs or WANs via a modem and temporary telephone link.

The network 140 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network 140 may also include an autonomous system of terminals, gateways, routers, and the like connected by wireless radio links or wireless transceivers. These connectors may be configured to move freely and randomly and organize themselves arbitrarily, such that the topology of the network 108 may change rapidly and arbitrarily.

The network 140 may further employ a plurality of access technologies including 4th (4G) or $5^{th}$ (5G) generation radio access for cellular systems; WLAN; Wireless Router (WR) mesh; and the like. Access technologies such as 4G, 5G, and future access networks may enable wide area coverage for mobile devices, such as the user devices with various degrees of mobility. For example, the network 108 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. The network 108 may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, the network 108 may include virtually any wired and/or wireless communication mechanisms by which information may travel between one computing device and another computing device, network, and the like.

Figure 2:
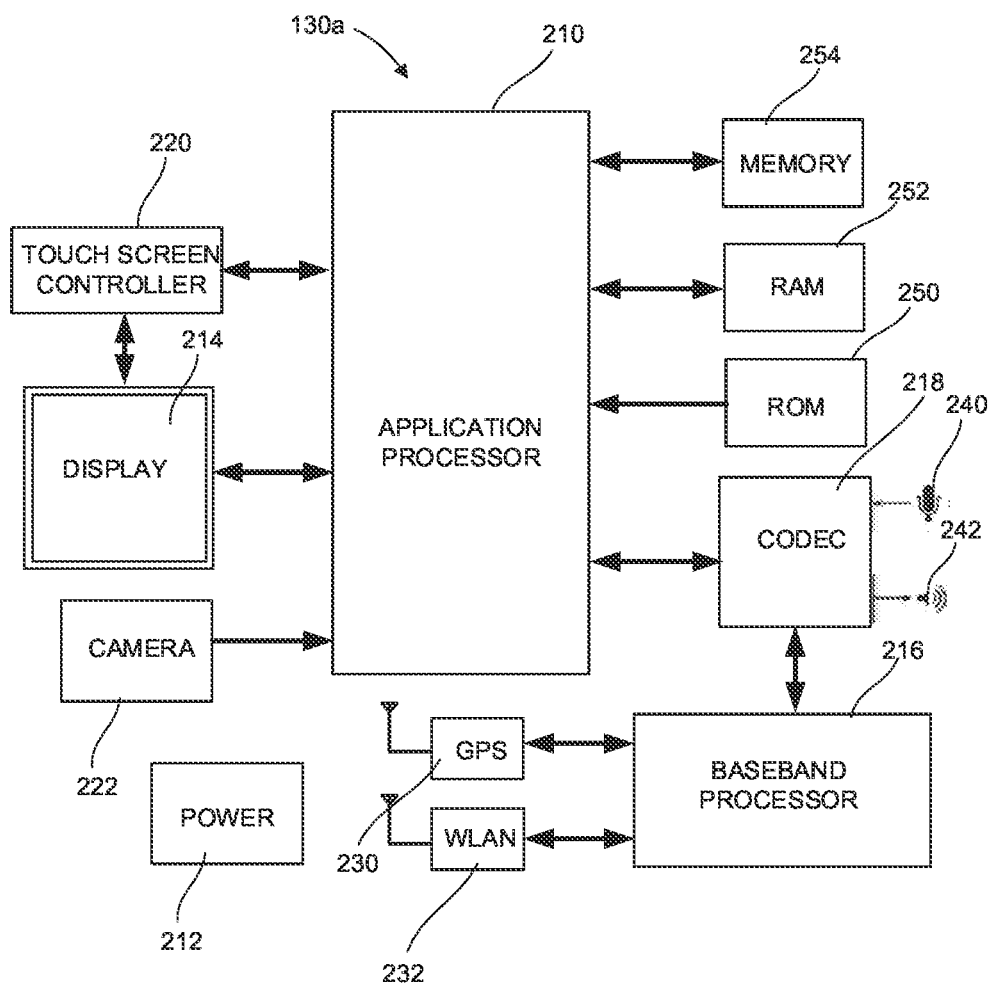
FIG. 2 is a block diagram of an example mobile user device.

FIG. 2 is a block diagram of the components of a mobile user device such as the mobile user device 130a in FIGS. 1A and 1B. The mobile user device 130a includes an application processor 210, a power source 212, a display 214, a baseband processor 216 (or similar wireless communication processors such as a Wi-Fi or Bluetooth processor), and a CODEC 218. In this example, the display 214 is an LCD touch screen that may allow the user to control the applications run by the application processor 210 via touch inputs as well as view graphics generated by the application processor 210. The display 214 may be controlled by a touch screen controller 220. The application processor 210 may be coupled to various devices such as a camera 222 and other interfaces such as a communication port, etc.

The baseband processor 216 receives signals from a network transmitter receiver 230 allowing communications with the network 140 in FIG. 1A and a geo-referencing receiver 232 that allows the reception of positioning data to determine the location of the mobile device 130a. The baseband processor 216 processes in the signals and is coupled to the CODEC 218, which converts the signals for use by the application processor 210. The CODEC 218 also decodes audio signals received by a microphone 240 and encodes data signals for output by a speaker 242 for functions such as a telephone application run by the applications processor 210.

The processors 210 and 216 may be conveniently implemented using one or more general purpose computer systems, microprocessors, digital signal processors, microcontrollers, application specific integrated circuits (ASIC), programmable logic devices (PLD), field programmable logic devices (FPLD), field programmable gate arrays (FPGA), and the like, programmed according to the teachings as described and illustrated herein, as will be appreciated by those skilled in the computer, software, and networking arts.

The operating system software and other applications are stored on read only memory (ROM) 250, random access memory (RAM) 252 and a memory storage device 254 for access by the applications processor 210. In this example, the memory storage device 254 is flash memory, but other memory devices may be used. The applications stored on the memory storage device 254 include the teleconferencing application, which creates interface graphics on the display and interfaces with a browsing application. Other forms of applications may incorporate the principles explained below. In this example, the teleconferencing application may be preloaded on the mobile user device 130a or may be offered as an application that may be downloaded to the mobile user device 130a from a network device such as a server via the network 140.

The memory storage device 254 includes a machine-readable medium on which is stored one or more sets of instructions (e.g., software) embodying any one or more of the methodologies or functions described herein. The instructions may also reside, completely or at least partially, within memory storage device 254, the ROM 250, the RAM 252, and/or within the processors 210 or 216 during execution thereof by the mobile user device 130a. The instructions may further be transmitted or received over a network such as the network 140 in FIG. 1A via the network transmitter receiver 230. While the machine-readable medium is shown in an example to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding, or carrying a set of instructions for execution by the machine and that cause the machine to perform any one or more of the methodologies of the various embodiments, or that is capable of storing, encoding, or carrying data structures utilized by or associated with such a set of instructions. The term "machine-readable medium" can accordingly be taken to include, but not be limited to, solid-state memories, optical media, and magnetic media.

A variety of different types of memory storage devices, such as a random access memory (RAM) or a read only memory (ROM) in the system or a floppy disk, hard disk, CD ROM, DVD ROM, flash, or other computer readable medium that is read from and/or written to by a magnetic, optical, or other reading and/or writing system that is coupled to the processor, may be used for the memory or memories in the user device 130a.

Figure 3A:
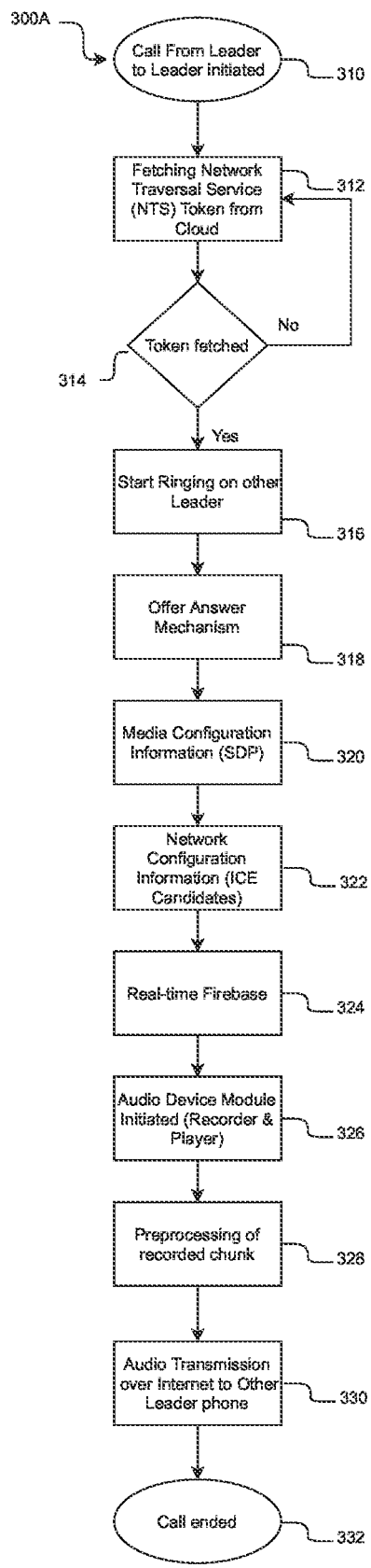
FIG. 3A is a flow diagram of the routine for communication between a leader device to another mobile user device designated as a leader device when a signal is received from an external communication device.

FIG. 3A is a flow diagram of the routine for communication between a client device to the mobile user device designated as a leader device when a signal is received from an external communication device (e.g., a leader device in another room). As shown in FIG. 3A, a communication may occur between leader devices such as the example mobile user devices 130a and 132a that are designated as leader devices in FIG. 1A (310). When a leader device tries to initiate a call with the other leader device, the initiating leader device may fetch a network traversal service (NTS) token from the database 142 or other backend service. Examples of the backend service may include the AWS Lambda function. Tokens may be ephemeral credentials allow access to Traversal Using Relay NAT ("Network Address Translation") (TURN) resources from WebRTC and VoIP clients. The tokens provide a secure way to create communication sessions with web browsers or mobile device applications without exposing authentication credentials in a client-side environment. All tokens may have a limited lifetime to protect from abuse. In this example, the token lifetime is configurable for any time up to 24 hours. Such a token is only required for multiparty conferencing between leader devices, which are remote from each other, to deal with Network Address Translation (NAT) related issues.

For ad hoc communication, the NTS token is not required. For example, the present disclosure contemplates client devices using Session Traversal Utilities for NAT (STUN), because there is no requirement of NAT Traversal in ad hoc communication.

The routine determines whether a token is fetched successfully (314). If an NTS token is not fetched successfully, the routine loops back and attempts to fetch an NTS token (312). If an NTS token is fetched successfully (314), a connection is established between two leader devices and the leader device that is contacted starts ringing (316). The configuration of an endpoint on a WebRTC connection is termed a session description. When a user starts a WebRTC call to another user, a special description is created termed an offer. This special description includes all the information about the caller's proposed configuration for the call. The recipient then responds with an answer, which is a description of their end of the call (318). In the Offer Answer mechanism, the session description includes information about the kind of media being sent, its format, the transfer protocol being used, the IP address and port of the endpoint, and other information needed to describe a media transfer endpoint. This information is exchanged and stored using Session Description Protocol (SDP) in the Cloud real-time database (320). ICE is a protocol that allows two devices to establish an interactive connection using offers and answers even if the two devices are separated by Network Address Translation (NAT). The caller pushes its ICE candidates on the firebase real-time database 142 while the callee fetches ICE candidates from the firebase real-time database 142 (322). In this way, both devices share the information needed to exchange media data with one another. This exchange is handled using a signaling mechanism which is being carried out using real-time firebase (324). A communication channel is thus established between the caller and the callee.

The audio device module of the leader device then initializes (326). The audio device module includes both an audio recorder and an audio player. Accordingly, the leader device is configured to continuously record and play audio packets. After initialization of the audio device module, the leader device records audio signals from its microphone 240 in FIG. 2 and sends the recorded audio signals for further audio pre-processing (328) (further described below in reference to FIG. 3B). These packets are transmitted to other remote mobile devices designated as leader devices (330).

Accordingly, FIG. 3A demonstrates improved communication between leader devices based on the disclosed WebRTC Audio Channel Pipeline in FIG. 3A and the disclosed processes for the audio channel of WebRTC. Namely, the present disclosure provides advantages over conventional processes because ad hoc devices (e.g., client devices) send and receive audio data over WebRTC Data Channel after required processing.

Figure 3B:
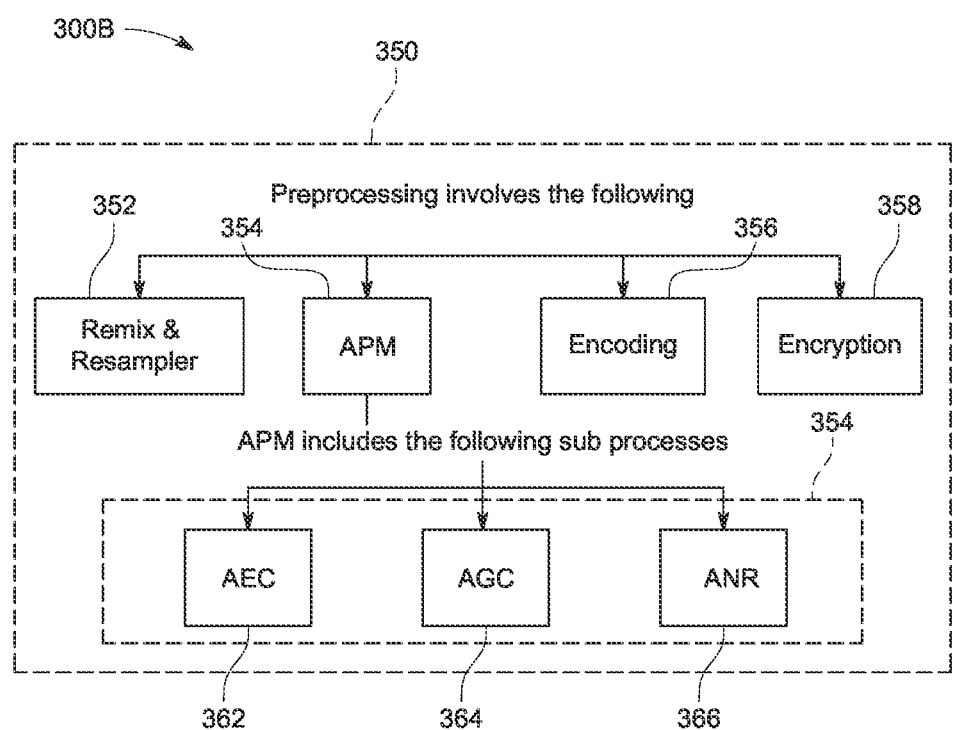
FIG. 3B is a flow diagram of the audio preprocessing module used in FIG. 3A.

Turning now to FIG. 3B, an exemplary system 300B is shown which performs preprocessing of step 328. For example, the system 300B is a WebRTC module. The system 300B includes a remix and resampling module 352, an audio processing module (APM) 354, an encoding module 356, and an encryption module 358. The APM 354 includes an acoustic echo cancellation (AEC) module 362, an automatic gain control (AGC) module 364, and an Adaptive Noise Reduction (ANR) module 366.

During preprocessing, the recorded chunks of the received audio signal are encoded using the encoding module 356, which in this example is an Opus encoder. After encoding the data, transmittable packets are generated from the recorded chunks of the received audio signal; the transmittable packets are then encrypted at the encryption module 358.

Additionally, the present disclosure contemplates that the system 300B is configured to perform all preprocessing of the audio signals at the local leader device, before transmitting these audio packets to remote leader devices. The remixing and resampling module 352 processes the recorded audio signals of the local leader device. For example, the recorded audio signal is multichannel, and the remixing and resampling module 352 decimates and mixes the audio signal to a single channel for the internal processing by the APM 354.

Turning back to FIG. 3A, the audio transmission step 330 further includes a packet formation step for the recorded audio. A transport layer and an IP address are attached in the packet generation stage. The present disclosure contemplates that the packets can contain any amount of audio data, preferably containing between 5 ms and 50 ms of audio data, and more preferably containing about 10 ms of audio data for Android devices and 40 ms of audio data for iOS devices. These packets contain audio metadata (e.g., a header) as well as encoded audio. The audio metadata may include information about the packet such as a sequence number of the packet and a time stamp.

Figure 4A:
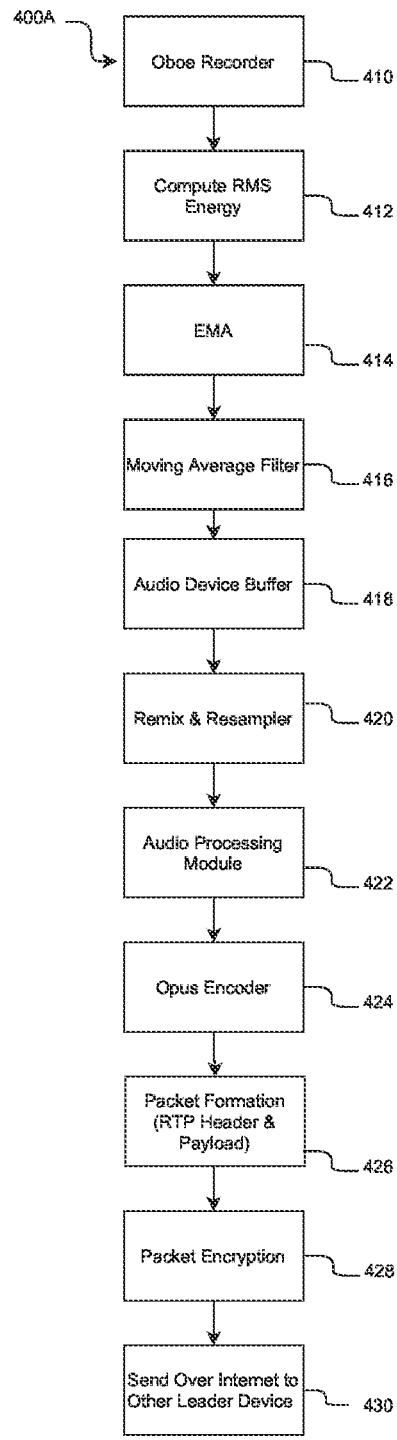
FIG. 4A is a flow diagram of the recording and transmitting of audio signals at a leader mobile device.

The overall process of recording and transmission of audio signals and forming audio packets at a leader device is shown in FIG. 4A as process 400A. The process 400A includes first recording an audio signal at an Oboe recorder module of the leader device (410). The leader device then calculates a root-mean-square energy (412) and an exponential moving average (EMA) (414) of the recorded signal, and passes the recorded signal through a moving average filter (416). The recorded packet is transmitted to an audio device buffer of the leader device (418). The recorded packets are remixed and resampled (420). The recorded packets are then transmitted by the audio device buffer to the APM 354 in the predetermined order for preprocessing (422).

Figure 4B:
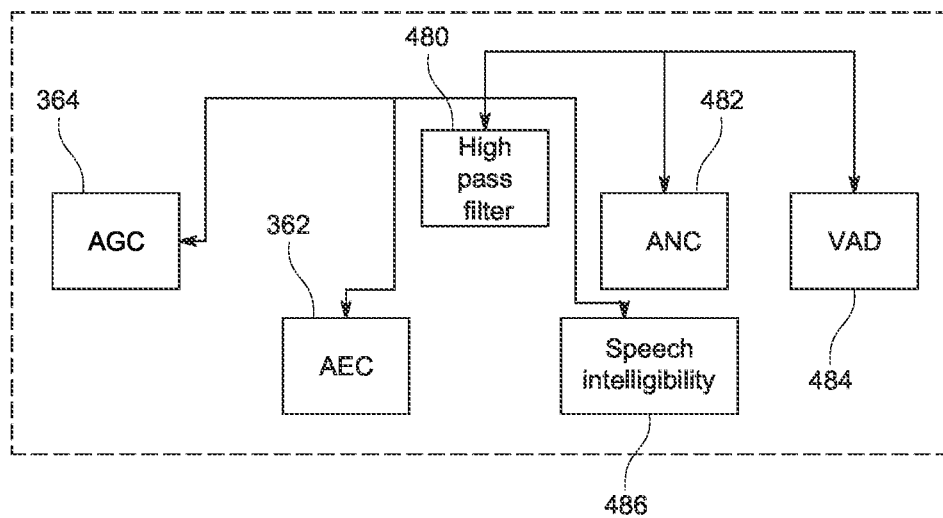
FIG. 4B is a diagram of the modules of an Audio Processing Module (APM)

Turning now to FIG. 4B, the APM 354 includes the automatic gain control (AGC) module 364, the acoustic echo cancellation (AEC) module 362, a high pass filter module 480, an adaptive noise canceller (ANC) module 482, a voice activity detector (VAD) module 484, and a speech intelligibility circuit 486. For example, the APM 354 as discussed in FIG. 4B provides additional detail of the modules included in an APM, according to the various embodiments of the present disclosure. The AGC module 364 amplifies the voice and sound. The AEC module 362 removes echo, reverberation, and unwanted added sounds from the audio signal. The high pass filter module 480 passes signals with a frequency higher than a threshold frequency and attenuates signals with frequencies lower than the threshold frequency. The ANC module 482 removes unwanted noise from the signal. The VAD module 484 and the speech intelligibility circuit 486 use speech processing algorithms and/or energy calculation algorithms to determine whether there is human speech in the recorded audio. For example, the VAD module 484 is part of, or communicatively coupled to, the ANC module 482. For example, the speech intelligibility circuit 486 is part of, or communicatively coupled to, the AEC module 362. In some examples, not shown, the APM 354 further includes a pre-amplifier module to amplify low level signals to a standard operating level.

Turning back to FIG. 4A, the processed audio signal is then encoded (424). Packets are formed by the packet formation module (426). For example, the recorded audio signal is split into a series of packets of audio data. In some examples, the packets are each similar in length to each other (e.g., preferably having a difference of 5 ms of audio data from each other, and more preferably having a difference of 1 ms of audio data from each other). Each packet is formed with an RTP header and a payload, as discussed further herein. The encryption module 358 encrypts the packets (428). A transceiver sends the packets to the network 140 (e.g., the Internet); the message is then transmitted over the network 140 and is routed to the other leader device(s) (430).

Figure 4C:
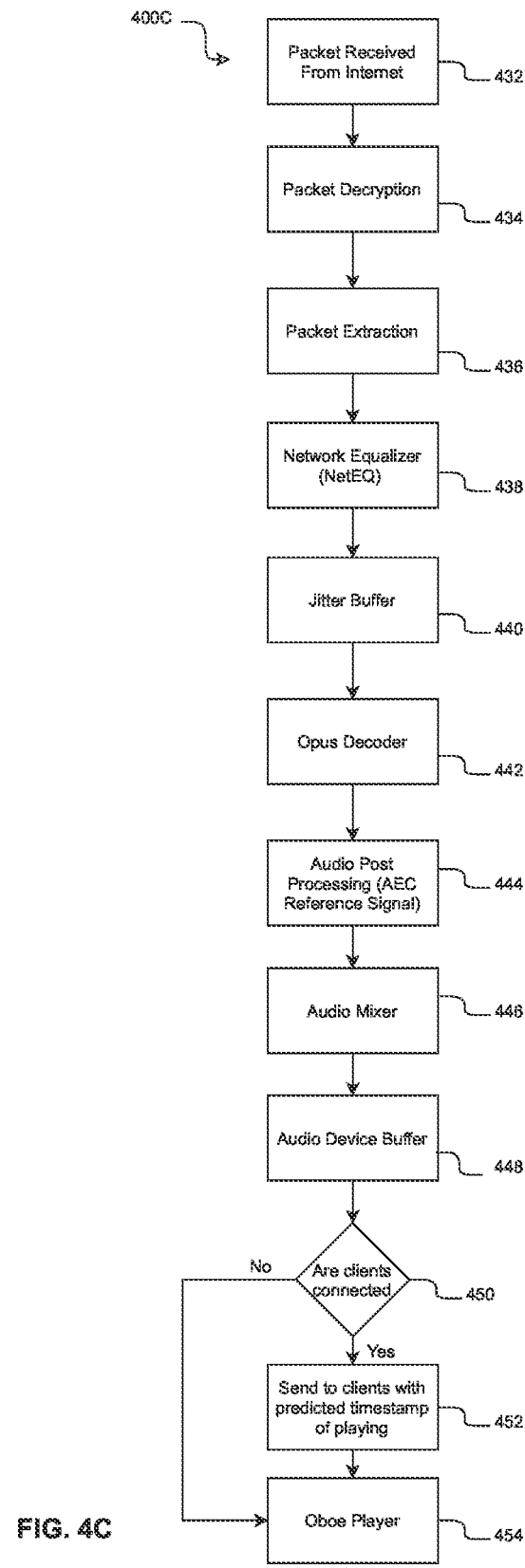
FIG. 4C is a flow diagram of receiving and playing audio signals received from remote leader devices.

Turning now to FIG. 4C, the other leader device(s) receive the packets from a network interface (432). The packets are decrypted (434). Data is extracted from the decrypted packets (436) into an RTP header and a payload. The extracted real-time protocol header data and payload data are sent to a NetEq module of an audio channel of the WebRTC to handle the network jitter (438), if any, so that the playout is synchronized between remote rooms. The packets are then buffered at a Jitter Buffer (440) and then decoded (442). These packets are then passed to a post-processing module to maintain the reference signal for AEC (444). The packets from other remote mobile devices designated as leader devices are then mixed (446). For example, if a leader device receives packets from multiple remote leader devices, the packets are mixed to form a single packet for playout in the local room of the leader device. The single packet from one leader device, or the single mixed packet from the N leader devices (in case of N-N communication) is then sent to all the Audio Device Buffer of the leader device (448). The leader device then determines if local client devices are connected (450). If the local client devices are connected, then the leader device transmits the single packet to the local client devices (452). If the local devices are not connected, then the leader device proceeds to step (454).

Each client device and the leader device use a player, such as an Oboe player, to playout the audio data (454). For example, the playout of step 454 includes decoding each received packet and extracting protobuff and payload values. In some examples of the present disclosure, WebRTC decoders are used to perform step 454.

Figure 5:
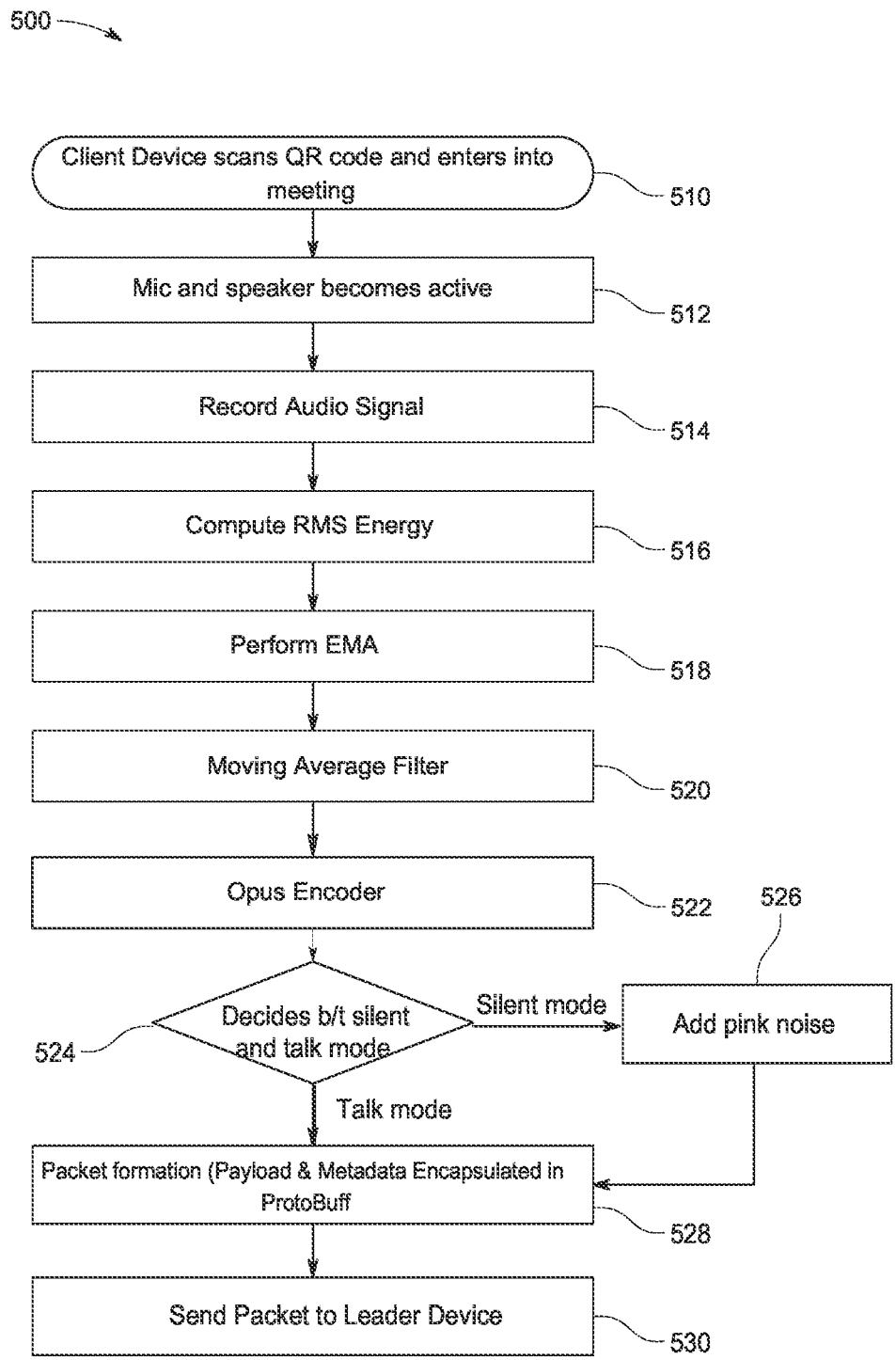
FIG. 5 is flow diagram of the process of a client device connecting with a leader device and the transmission of audio signals from the client device to the leader device.

FIG. 5 shows the process of recording audio signals and forming audio packets at a client device as recording process 500. The mobile user device scans a QR code displayed on the mobile device designated as the leader device or receives the information from the QR via an NFC mechanism from the leader device (510). For example, the QR code includes room identification information and meeting identification information.

Figure 8:
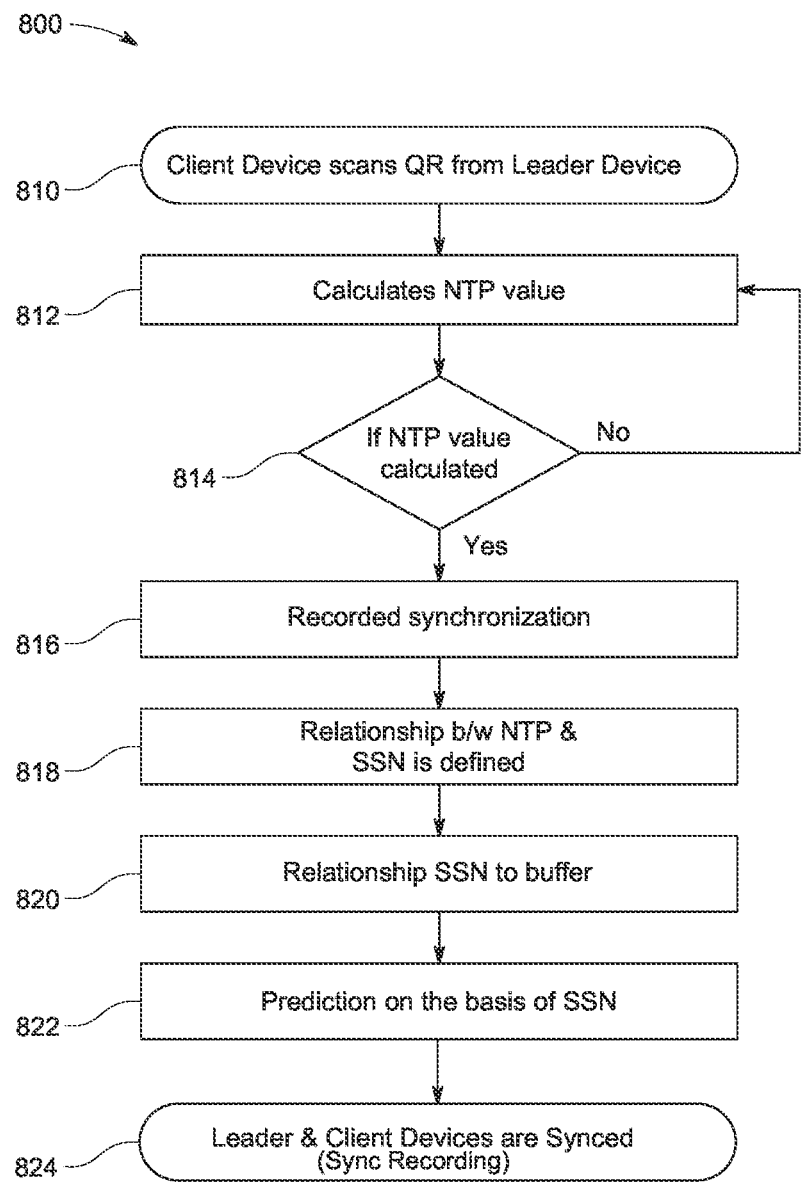
FIG. 8 is a flow diagram of the process of establishing communication between the leader device and the client devices to record an audio signal in sync with each other.

After the information is received from the QR code or the NFC communication, that client device calculates a Network Time Protocol (NTP) value, as discussed further below regarding FIG. 8. The microphone and speaker of the client device are then activated (512), and the client device records an audio signal (514).

The client device computes the root mean square energy of the audio signal (516). An exponential moving average (EMA) is performed on the audio signal to smooth variations in the energy of the audio signal (518). The audio signal then goes to a moving average filter (520). The audio signal is encoded using opus encoder (522). The opus encoder decides whether the signal is either a silent or active voice based on voice activity detection and speech presence probability (524). If no one is speaking, indicating a silent voice through the microphone, then pink noise, or no noise (e.g., a stream of empty or '0' bits) is added to the audio signal; the stream of empty or '0' bits replaces the original recorded data (526). Accordingly, the stream of empty or '0' bits saves network bandwidth and helps conserve processing power, which is more advantageous than sending the original audio data. The audio signal (either with the added pink noise or with the original audio data) is then used to form a packet (528). If the audio signal is an active voice, the packets are formed from the active voice signal and the protobuff data contains any necessary information to synchronize the client or leader device with other local devices. The packets from the audio signal are then sent to the leader device (530).

Figure 6:
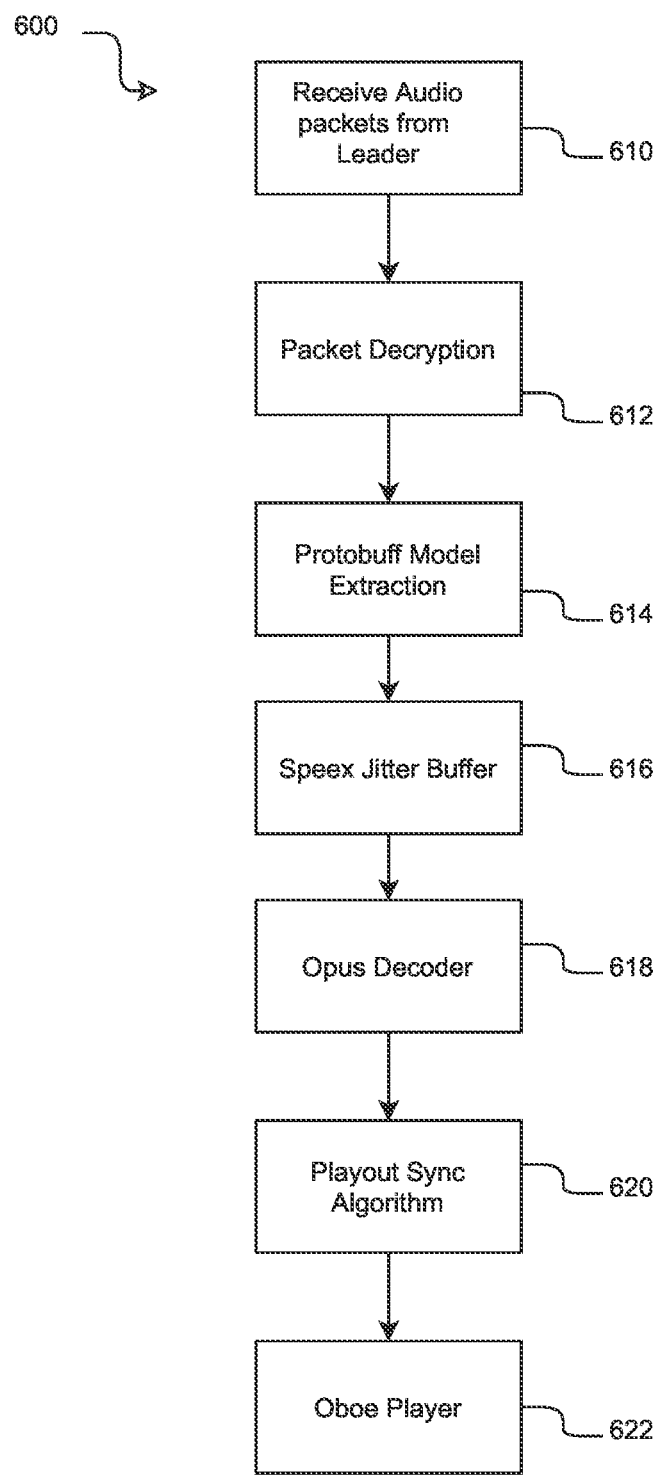
FIG. 6 is a flow diagram of the example process of a client device receiving audio signals from a leader device for playing audio data.

Further, client devices receive audio signal data from the local leader device. FIG. 6 shows the playout process 600 of how client user devices process and output the audio signal received from the local leader device. Voice packets are received at the leader device and sent to the client device (610). These packets are coming from WebRTC data channel and are then decrypted (612). The client device performs extractions of header and payload data from the received packets according to a protobuff model extraction (614). The packets are then sent to the Speex jitter buffer to handle network jitter (616). The signal is then decoded with an Opus decoder in this example (618). The sync algorithm 368 is executed to ensure synchronization with the other mobile user devices in the room (620). The client device then plays the voice signal (622).

Figure 7:
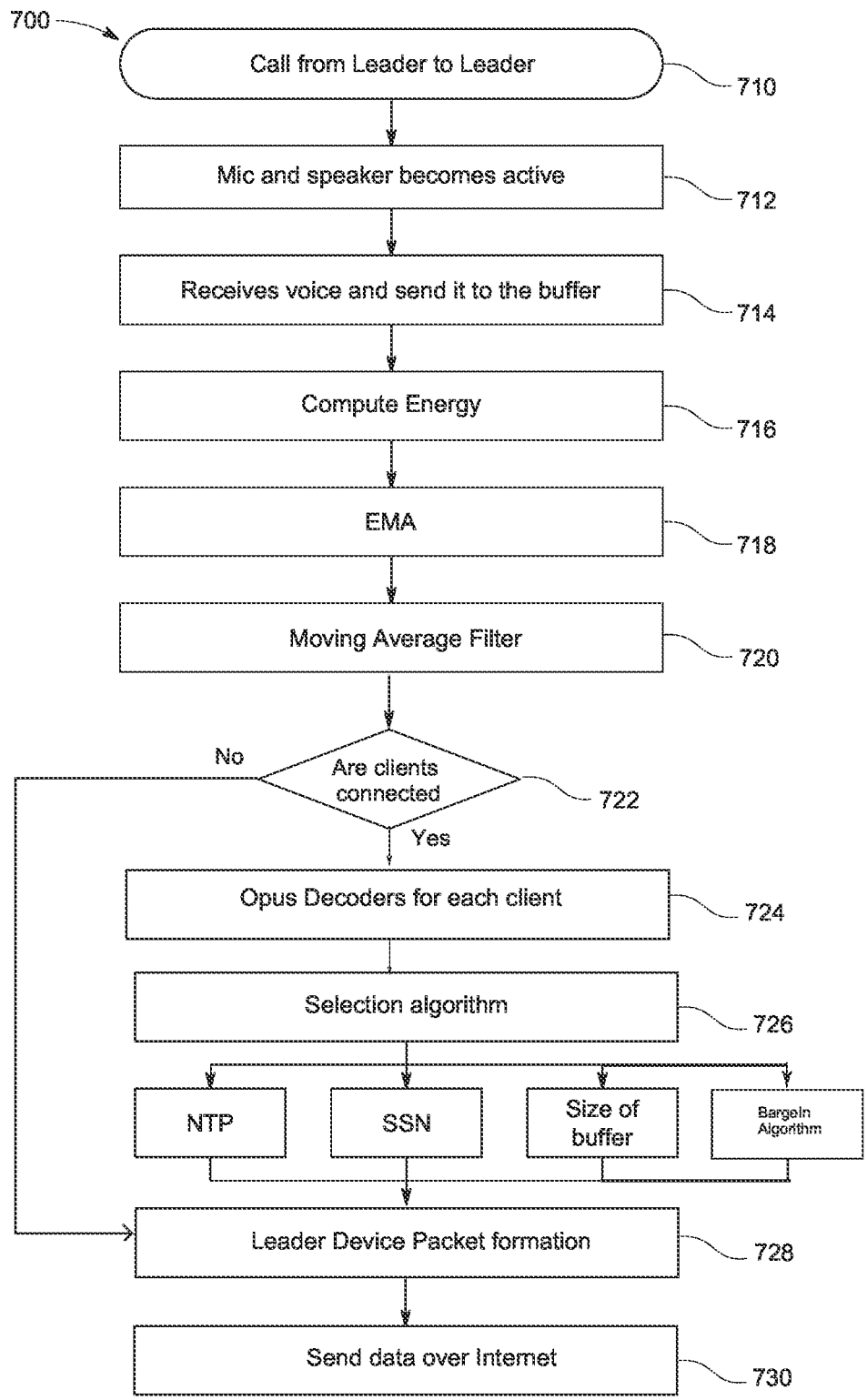
FIG. 7 is a flow diagram of the combined process of processing audio data received by a leader device from client devices and transmitting audio signals from the leader device to another leader device.

FIG. 7 shows the receiving and transmitting process 700 for a leader device to process audio data and send to a remote leader device. A first leader device calls a second (and remote) leader device (710), this attempt starts the ringing on the second leader device. After the user of the second leader device accepts the call from the first leader device, the microphone and speakers of the first leader device become active to receive and play audio signals (712). Received audio signal from the microphone of the first leader device is recorded and is sent into the buffer of the first leader device (714). Once an audio signal is sent into the buffer, the energy of the audio signal is computed (716). An exponential moving average (EMA) is calculated (718) on the audio signal to smooth energy variation of the audio signal. The computed energy is sent to the moving average filter (720). The moving average filter computes an average of the current packet with respect to data collected prior to the current packet, over a threshold period of time (e.g., 1 second of data). The first leader device then makes a determination about whether client devices are connected to the leader device (722).

If client devices are connected with the first leader device, then an opus decoder of the leader device decodes audio signals from the connected client devices (724). A selection algorithm is then performed on the decoded audio signals (726). The selection algorithm selects a packet for transmission from among corresponding packets from all local devices based on NTP, SSN, size of buffer values, the BargeIn Algorithm, and other considerations as discussed herein. In some examples, step 726 selects a packet from among corresponding packets which has the highest energy value or the loudest volume. All selected packets are passed through a BargeIn Algorithm, which is used to: (1) minimize false switching between the client and the leader device; and (2) minimize clipping of voice signals. The selected speaker decoded audio signal is passed to the audio channel of the first leader device for further pre-processing and packet formation (728) before transmitting it to the second (and remote) leader device over the Internet (730).

If client devices are not connected, then a selection algorithm is not performed and the first leader device's audio signal is passed to audio channel for further pre-processing and packet formation (728) before transmitting it to remote leader device over the Internet (730).

Each mobile device must be synchronized with each local mobile device so that the local devices record audio at the same time. Typically, a synchronization process is performed at the leader device for all local devices. FIG. 8 shows a synchronization process 800 for establishing communication between the leader device and the client devices to record the same audio signal at the same time (e.g., SSNs from each local device will be correlated with each other). The NTP is a networking protocol for clock synchronization between computer systems over packet-switched, variable-latency data networks. The NTP is intended to synchronize all participating computers to within a few milliseconds of the leader device's system time. The NTP can achieve better than one millisecond accuracy in local area networks under ideal conditions. Asymmetric routes and network congestion can cause errors of 100 ms or more. After calculating an NTP value, each of the client devices synchronizes its time according to the leader device, so the client devices record and play an audio signal in sync with each other and with the leader device. Accordingly, the calculation of the NTP value allows synchronization of the devices once the hardware latency is accounted for.

A client device scans the QR code displayed by the leader device or joins communication with the leader device via NFC (810). The client device calculates a network time protocol (NTP) value (812). The sync algorithm determines whether an NTP value with a threshold value is calculated (814). For example, the threshold value is 5 ms. If an NTP value is calculated that is greater than the threshold value, then the client device returns to step 812. If an NTP value is calculated that is less than or equal to the threshold value, then the client device proceeds to step 816.

The client device then performs a recorded synchronization so that the microphone of the client device will record at the same time as all other local devices, based on the NTP (816). For example, the NTP provides for the synchronization of all local devices' real-time clocks in an ad hoc network. The client device determines synchronized stream numbers (SSNs) based on the NTP (818). SSNs are associated with each audio packet so that the order of the packets is maintained and identifiable; the SSNs are also used by the selection algorithm as discussed above to ensure that the audio is being selected based on packets that are recorded coherently to avoid doubling of voice when the leader devices switch selection of the audio signal between different local devices. The relationship of the SSN is then formulated to the amount of data stored in the recorded buffer (820). Based on SSN, NTP time is predicted on which recording is started on all the client devices (822). Accordingly, all local devices are then synchronized in recording with respect to the leader device (824).

The NTP uses a hierarchical, semi-layered system of time sources. Each level of this hierarchy is termed a stratum and is assigned a number starting with zero for the reference clock at the top. A server synchronized to a stratum n server runs at stratum n+1. The number represents the distance from the reference clock and is used to prevent cyclical dependencies in the hierarchy. The stratum is not always an indication of quality or reliability; it is common to find stratum 3 time sources that are higher quality than other stratum 2 time sources.

For example, a client device regularly polls its associated leader device to determine an NTP calculation. The client must compute its time offset and round-trip delay. Time offset θ, the difference in absolute time between the two clocks, is defined by:

$$\theta = \left| \frac{(t_1 - t_0) + (t_2 - t_3)}{2} \right|$$

and the round-trip delay δ is determined by:

$$\delta = (t_3 - t_0) + (t_2 - t_1)$$

In these equations, $t_0$ is the client's timestamp for transmitting a request packet; $t_1$ is the server's timestamp of receiving the request packet transmitted to the server by the client; $t_2$ is the server's timestamp for transmitting the response packet; and $t_3$ is the client's timestamp for receiving the response packet transmitted to the client by the server.

To derive the expression for the offset, note that for the request packet, $$t_0 - \theta + \delta/2 = t_1$$

and for the response packet, $$t_0 + \theta - \delta/2 = t_2$$

Solving for θ yields the definition of the time offset. The values for θ and δ are passed through filters and subjected to statistical analysis. Outliers are discarded until only a threshold number of candidates remain (e.g., three remaining candidates). An estimate of time offset is derived from the remaining candidates. The clock is then adjusted to reduce the offset gradually, creating a feedback loop. Accurate synchronization is achieved when both the incoming and outgoing routes between the client and the server have symmetrical nominal delay. If the routes do not have a common nominal delay, a systematic bias exists of half the difference between the forward and backward travel times.

Figure 9:
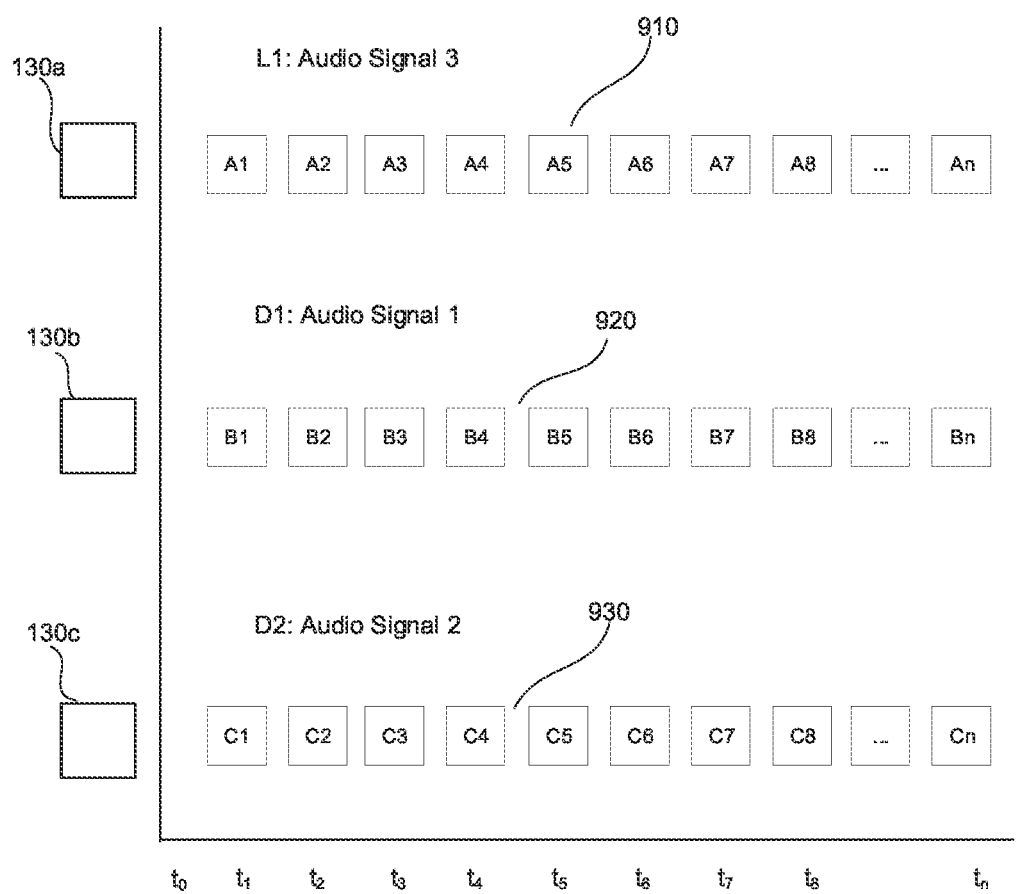
FIG. 9 is a diagram of the process of selection of packets of the same audio signals from different client devices for the microphone selection.
Figure 10:
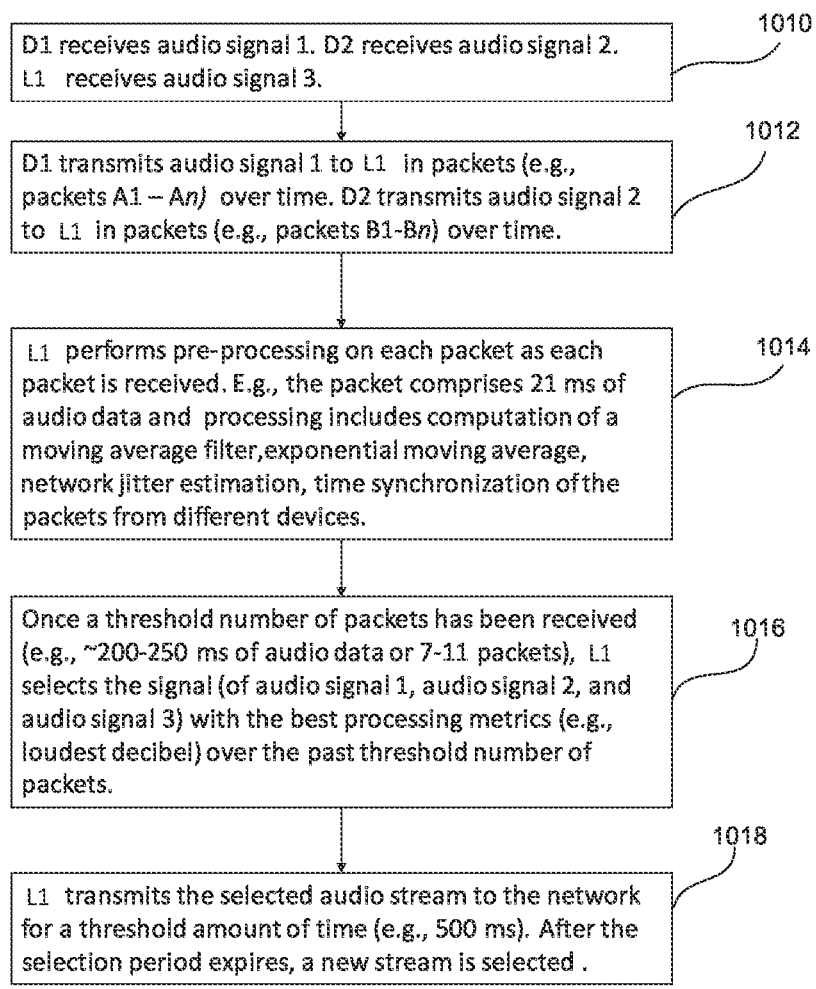
FIG. 10 is a flow diagram of the process of selecting one of the streams of the same audio signal performed by the leader device.

FIGS. 9 and 10 will be discussed in tandem. FIG. 9 demonstrates packet formation and transmission from recorded audio signals for mobile devices 130*a*-130*c*. FIG. 10 demonstrates a selection process 1000, where one of the recorded audio from each of mobile devices 130*a*-130*c* is selected for transmission to remote devices.

Turning first to FIG. 9, devices 130*a*, 130*b*, and 130*c* may be the devices 130*a*, 130*b*, and 130*c* from room 110 of system 100 of FIGS. 1A-IB. One of the participants in the room 110 may start speaking. The resulting audio signal is detected by the microphones of all the mobile user devices 130*a*-130*c*. Each of the mobile devices 130*a*-130*c* records the audio signal and breaks the recorded audio signal into packets through the routine in FIG. 5 or 7. Thus, a first set of packets 910 is produced by the leader device 130*a* from the recorded audio signal. Another set of packets 920 is produced by the client device 130*b* from the recorded audio signal. The client device 130*c* produces another set of packets 930 from the recorded audio signal.

Turning now to FIG. 10, the present disclosure contemplates an exemplary process 1000 of stream selection. All of the mobile user devices receive an audio signal from the same source (1010). Because of a time delay or other factors about the room as discussed earlier, the audio signal received at each device may vary slightly, and accordingly, D1 receives and records Audio Signal 1, D2 receives and records Audio Signal 2, and D3 receives and records Audio Signal 3.

Each of the mobile user devices D1, D2 converts the signal to packets for transmission to the leader phone (1012); for example, an exemplary process for packet formation from recorded audio is discussed above regarding FIGS. 5-7. After formation, each packet is transmitted from the client devices to the leader device L1. For example, D1 transmits audio signal 1 to L1 in packets A1-An over a period of time. For example, D2 transmits audio signal 2 to L1 in packets B1-Bn over a period of time. For example, L1 receives packets A1 and B1 at a similar time as packet C1 is formed, L1 receives packets A2 and B2 at a similar time as packet C2 is formed, and L1 receives packets An and Bn at a similar time as packet Cn is formed. The times for receipt of packets from D1 and D2 vary according to network jitter and the synchronization process 800 discussed above regarding FIG. 8.

The leader device performs processing on each packet through the preprocessing module 354 described in FIG. 3 (1014). Once a threshold number of packets have been received, the leader device selects the mobile device corresponding to at least one packet with the best processing metrics over a threshold evaluation period of time (1016). For example, the leader device evaluates the mobile device corresponding to at least one packet with the best metrics over a threshold period of time (e.g., the period of time can correspond to 200-250 ms of audio data or 7-11 packets). The processing metric may be the loudest signal in terms of decibels or the signal with the greatest clarity, or otherwise as discussed herein. For example, if packets A1-A11 are superior to packets B1-B11 and superior to packets C1-C11, then the audio stream 930 from device 130*c* is selected by step 1016.

The leader device then transmits the selected audio stream of packets to the network 140 for transmission to the remote leader devices; the remote leader devices then transmit the received audio stream to their corresponding local client devices (1018). The selected audio stream is transmitted for a threshold transmission period of time. For example, if audio stream 930 is selected according to step 1016, then step 1018 provides for transmitting audio stream 930 to the network 140 for said threshold period of time. In some examples, the threshold transmission period of time in step 1018 is longer than the threshold evaluation period of time in step 1016. For example, the threshold transmission period of time is between 300-700 ms, and preferably around 500 ms.

The leader device may repeatedly perform steps 1014 to 1018 to periodically re-evaluate which audio stream to transmit to other leader devices. In this process, the leader device does not need to evaluate all of the audio data from each device in the room. Instead, the leader device may evaluate only subsets of the audio data received, such as the sequences of packets representing particular windows of time used as evaluation periods. These evaluation windows are spaced apart so that evaluated sequences of audio packets have sequences of non-evaluated audio packets between them. Based on each evaluation, the leader device selects an audio stream to be transmitted for a limited portion of the call, and the leader device L1 can transmit a predetermined amount of audio packets (e.g., packets representing a predetermined duration of recorded audio) of the selected audio stream after each evaluation. The leader device L1 transmits an amount of audio packets representing a predetermined amount of time that exceeds the duration of the evaluation period. For example, after each evaluation, the leader device L1 can transmit a portion of the selected audio stream that includes (i) the sequence of audio packets of the selected stream that correspond to the evaluation period, and (ii) a predetermined amount of additional audio packets of the selected stream that follow the audio packets corresponding to the evaluation period.

In many cases, transmitting more audio data than is included in an evaluation period can provide various advantages. For example, using a predetermined duration for each transmission period, the leader device can provide audio in segments that each provide at least a minimum duration for playback. This helps keep the overall output audio stream smooth and improves audio quality by avoiding too-frequent switching between audio streams. By transmitting at least a minimum duration of audio data (e.g., for a fixed length of 500 ms) for each stream selection evaluation provides consistency that increases the intelligibility of audio streams transmitted to other rooms.

In addition, limiting evaluation of audio streams to certain evaluation periods (e.g., evaluation periods shorter than the transmission periods) reduces processing load on the leader device. This contributes to increased efficiency and lower power consumption of the leader device, which is often a battery-powered mobile device. Rather than evaluating all of the packets of all of the devices, the leader device can evaluate audio packets representing a fraction of the total duration of a call. For example, if the leader device uses evaluation periods each having a duration of 250 ms, and if the leader device transmits 500 ms of audio data for each evaluation (e.g., the 250 ms of audio data evaluated as well as the subsequent 250 ms of audio data), the processing to evaluate audio data recorded in the room is half as much as if all audio data were evaluated. The efficiency can be increased with different ratios of evaluation periods to transmission periods. For example, using an evaluation period of 200 ms and a transmission period of 800 ms uses only one quarter of the amount of processing as evaluating all audio packets. This efficiency benefit can be especially useful as number of devices in a room, and thus the number of audio streams to be evaluated, increases.

Using these techniques, the transmission duration or the frequency between evaluations can be set to provide high responsiveness during a call. For example, the transmission duration can be one second or less, allowing re-evaluation of which audio stream to output at least once per second or more frequently. This can enable the leader device to vary which audio stream is transmitted, such as to switch between audio streams as users of different client devices alternate speaking or as movement of devices in the room changes which audio stream provides the highest quality.

As a more detailed example, the leader device L1 receives audio streams from one or more other devices D1, D2 in the room. As the audio streams are received, the leader device L1 uses the timestamps and sequence numbers transmitted with the audio streams to correlate the audio data from multiple devices. For example, as shown in FIG. 9, the leader device L1 can determine an alignment of audio packets from each of devices L1, D1, and D2 with respect to time, so that the audio packets representing the same times are known. The leader device L1 can also store and retrieve values of parameters that set the characteristics of the evaluation. These parameters can set the duration of the evaluation period, to specify the length of time or number of packets to be evaluated for each stream selection decision. The parameters can also set the duration of the transmission period, to specify a predetermined amount of audio data to be transmitted per evaluation, whether specified as a total amount of audio data per evaluation or an amount of additional audio packets to provide in addition to the audio packets evaluated in the evaluation period.

As an example, audio packets may be generated to each encode 25 ms of audio data. The leader device L1 can retrieve stored parameter values that set the evaluation period to be 8 packets or 200 ms of audio data, and to set the transmission period to be 20 packets or 500 ms of audio data. In many cases, the transmission period is twice as long as the evaluation period or longer (e.g., three times, four times, five times, etc.). As a result, the predetermined amount of additional audio packets used after each audio stream selection can be a duration of audio data that is as great as or is greater than the duration of audio data assessed in the corresponding evaluation period. For example, for each evaluation of a 200 ms window of audio data, the leader device may transmit 500 ms of audio data from the selected stream (e.g., the 200 ms of evaluated audio data packets in the selected stream, plus the subsequent 300 ms of audio data packets that immediately follow the audio data packets in the evaluation period).

Referring to FIG. 9, the leader device can set one evaluation period to be from $t_0$ to $t_8$. The leader device L1 can evaluate each of the respective audio streams in the room, e.g., the set of packets 910 from the leader device L1, the set of packets 920 from the client device D1, and the set of packets 930 from the client device D2. The evaluation can include generating one or more metrics for each of the audio streams using the packets in the evaluation period. Thus, the leader device L1 evaluates one or more metrics for the group of packets A1-A8, one or more metrics for the group of packets B1-B8, and one or more metrics for the group of packets C1-C8. The metrics for each group of packets can include scores for loudness, clarity, voice activity level, and so on. The leader device L1 evaluates the audio streams by comparing the scores for the different audio streams to determine which one has speech or other audio with the highest quality.

After selecting the audio stream based on the evaluation, the leader device L1 transmits a predetermined amount of packets as specified by the stored parameter value(s) that set the duration of the transmission period. For example, based on the evaluation of packets A1-A8, B1-B8, and C1-C8, the leader device L1 may select the audio stream of the client device D1 as having voice activity with the highest quality. Using a predetermined transmission period of 500 ms, the leader device sends 500 ms of audio data from client device D1 (e.g., packets B1-B20). This includes the audio packets B1-B8 in the evaluation period, as well as additional packets B9-B20 that were not assessed in the evaluation. After the end of the transmission period, the leader device L1 then begins the next evaluation. For example, the leader device L1 would evaluate groups of packets A21-A28, B21-B28, and C21-C28 in a second evaluation period of the same predetermined duration used before, e.g., 200 ms. The leader device L1 would select which of the audio streams provides the best audio data in the second evaluation period, before transmitting packets in a second transmission period that has the same predetermined duration used in the first transmission period. If the second evaluation shows that the leader device L1 has the best audio recording, then the leader device L1 will transmit 500 ms of audio data from its own stream, e.g., packets A21-A40. In this manner, the leader device L1 can periodically re-evaluate which audio stream has the highest voice activity and quality, and can change the source audio stream that is transmitted accordingly.

The example application also performs reverberation cancelation for the user devices in a room. Reverberation occurs when audio signals reverberate from the walls, furniture, or other physical obstacles of the rooms. Echo occurs when the audio output of a device is received at a microphone or recorder of the same device; the present disclosure also contemplates that echo includes the synchronized audio output from other local devices that is received at the microphone/recorder of the device. Each mobile device has echo cancellation abilities inherent to the device which reduce feedback during audio and video calls/conferencing. For example, each device is configured to determine its impulse, which is the difference between audio signal output by the device and received audio signal input of the device. Because the audio signals are synched by the disclosed methods for playout at all local devices, the difference in audio input and output at each device is negligible so the echo cancellation of each device is able to inherently cancel any echo or reverberation received at the device coming from synchronous playout from other local devices. This advantageous echo cancellation is only possible because the disclosed methods provide superior synchronization than conventional methods.

Figure 11:
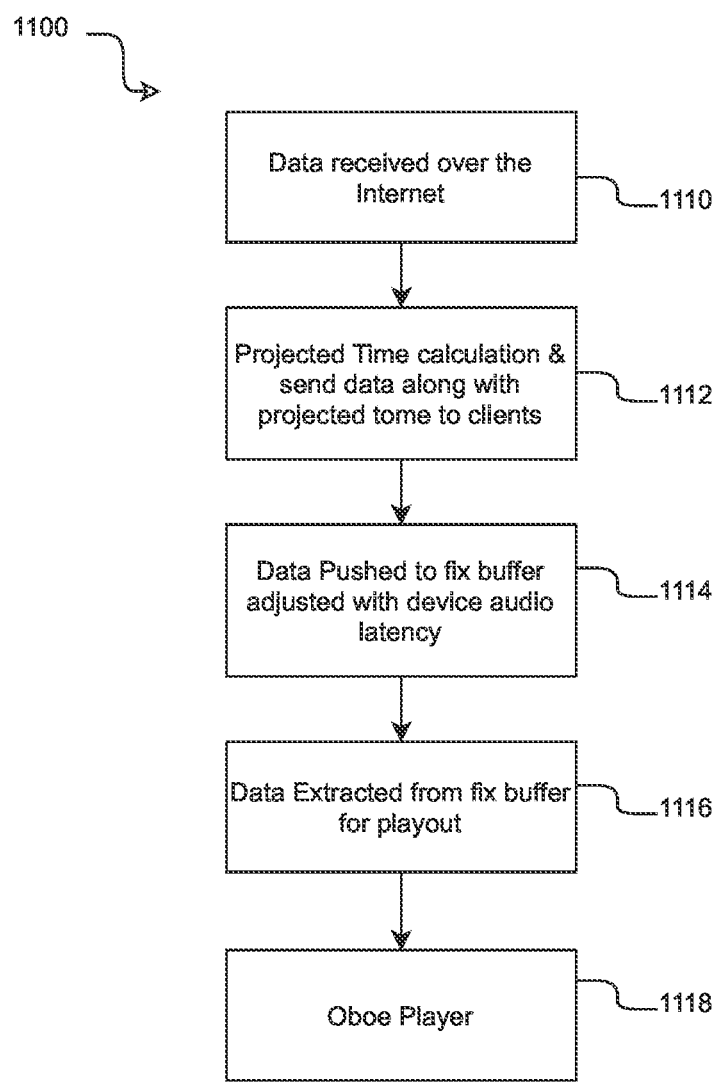
FIG. 11 is a flow diagram of playout sync algorithm of a leader device.

FIG. 11 shows a process 1100 for the playout sync algorithm for a leader device. As shown in FIG. 11, the audio packets are received by a local leader device from a remote leader device over the Internet (1110). Play time for this audio packet is calculated based on a fixed size buffer added to compensate the network delay between the local leader device and local client devices. Then, the calculated play time is sent to the client devices from the local leader device along with an encoded version of audio packets (1112). The extracted payload is then pushed into a fixed size buffer on the leader device (1114). The buffer length may be fixed but, to cater for hardware latency of the leader device, then the buffer size is adjusted once. This has no effect on the projected play time which is sent to client devices. The buffer is then dequeued and the data is extracted from the audio packets for playout (1116). Payload data is then fed to the leader device for playout using oboe player (1118).

Figure 12:
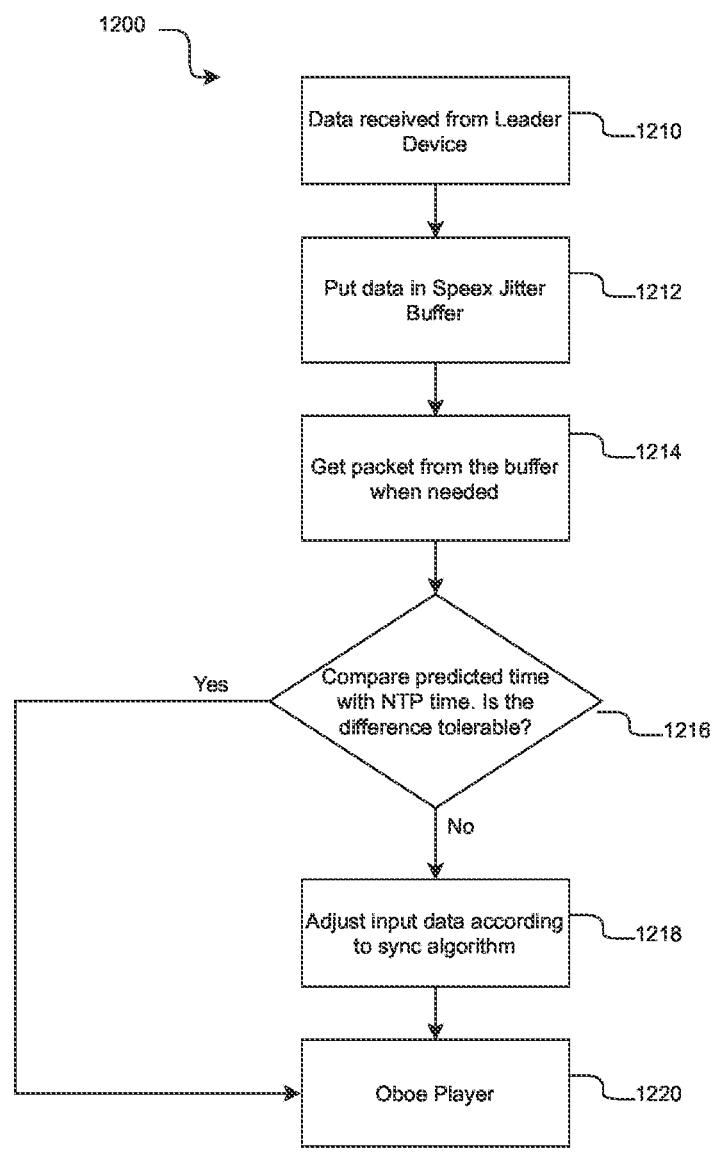
FIG. 12 is a flow diagram of playout sync algorithm of a client device.

A process 1200 of the playout sync algorithm for client devices is shown in FIG. 12. The audio packets are received at a local client device from a local leader device (1210) and put into a Speex jitter buffer of a client device (1212). A packet is extracted from this buffer upon playout requests (1214). Payload data is decoded and the attached playout time provided by the leader device is compared with the current time (1216). If the difference is tolerable, the packet is sent for playout (1220). If the difference is not tolerable, the sync algorithm at the client device adjusts audio packets to align time (1218). Current time on client devices means is defined as:

Current Time=System Time+NTP Offset+Hardware Latency

The data is then sent back to oboe player after its adjusted by sync algorithm for playout (1220).

Although the above examples relate to audio signals, it is to be understood that the same principles may be applied to image streams used in video conferencing. As explained above, each of the mobile devices may include a camera that allows the capture of a video stream of the participant. The different video streams may be combined by the leader phone and sent to other participants via the respective leader phones in other rooms. The leader phone may also receive and route received external video streams to the client devices in the room. The respective video streams may be displayed on the displays of the mobile devices in the room.

The flow diagrams in FIGS. 3-8 and 10 are representative of example machine readable instructions for processing audio signals from within the ad hoc network and from external devices. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithms are described with reference to the flowcharts illustrated in FIGS. 3-8 and 10, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for establishing a teleconferencing system between two locations, comprising:
   transmitting, by a leader device, a first signal between the leader device and a client device, wherein the leader device and the client device each includes a network transceiver, a speaker, and a microphone;
   generating, by the leader device, a first audio packet based on audio produced by an audio source and received at the leader device;
   receiving, by the leader device, a second audio packet from the client device, wherein the second audio packet was generated by the client device based on the audio produced by the audio source;
   obtaining, by the leader device, a first metric for the first audio packet generated by the leader device based on the audio produced by the audio source;
   obtaining, by the leader device, a second metric for the second audio packet generated by the client device based on the audio produced by the audio source;
   determining which of (i) the first audio packet generated by the leader device and (ii) the second audio packet generated by the client device has a higher quality, wherein the determination is based on the first metric for the first audio packet and the second metric for the second audio packet; and as a result of determining that the first audio packet generated by the leader device has a higher quality than the second audio packet generated by the client device, transmitting to a third device the first audio packet generated by the leader device, otherwise transmitting to the third device the second audio packet generated by the client device.

2. The method of claim 1,
determining which of the first audio packet generated by the leader device and the second audio packet generated by the client device has a higher quality comprises determining whether the first metric is greater than the second metric.

3. The method of claim 1,
wherein
the method further comprises the leader device transmitting a third packet generated by the leader device as a result of determining that the first packet generated by the leader device has a higher quality than the second packet generated by the client device.

4. The method of claim 1, further comprising:
receiving a visual signal from the third device; and
outputting the visual signal on displays of the leader device and the client device.

5. The method of claim 1, wherein the transmitting to the third device is performed using a voice over Internet protocol through the Internet.

6. The method of claim 1, further comprising:
the leader device receiving from the third device a third audio packet;
the leader device outputting audible audio based on the third audio packet; and
forwarding the third packet to the client device, wherein the client device is configured to output audible audio based on the third audio packet, and the audible audio output by the client device is phase shifted with respect to the audible audio output by the leader device.

7. The method of claim 1, wherein
the method further comprises the leader device transmitting a third packet generated by the client device as a result of determining that the second packet generated by the client device has a higher quality than the first packet generated by the client device.

8. The method of claim 1, wherein each of the leader device and the client device are smart phones.

9. The method of claim 1, wherein transmitting the first signal between the leader device and the client device further comprises establishing, by the leader device, network with the client device based on the client device receiving network information through a visual indicator displayed by the leader device.

10. The method of claim 1, wherein transmitting a first signal between a leader device and a client device further comprises establishing network communication, by the leader device, with the client device based on the client device receiving network information through a wireless communication.

11. The method of claim 1, wherein the first metric is based on an average energy of the first audio packet.

12. The method of claim 1, wherein the first signal comprises a transmission using a Web RTC data channel.

13. The method of claim 1, wherein the leader device is configured to transmit audio packets to the third device using a WebRTC audio channel.

14. The method of claim 1, wherein the first signal comprises a first frequency.

15. The method of claim 14, further comprising:
transmitting a second signal comprising a second frequency between the leader device and the client device; and
syncing the leader device and the client device based on at least one of the first signal and the second signal.

16. The method of claim 1, further comprising obtaining, by the leader device, a code for a call or conference that includes communication over a network between the leader device and at least one other leader device;
wherein transmitting the first signal comprises providing, by the leader device, output of the code; and
wherein the method further comprises, after providing output of the code, enabling participation of the client device in the call or conference in response to a communication that the client device provides based on the code, such that the leader device receives audio data recorded by the client device and the leader device provides audio data from the at least one other leader device to the client device.

17. The method of claim 16, wherein the code identifies (i) the call or conference and (ii) a room, from among multiple rooms involved in the call or conference, that corresponds to the leader device.

18. The method of claim 1, further comprising:
maintaining, by the leader device, communication with each of multiple remote devices that are concurrently involved in a call or conference;
receiving, by the leader device, audio data from each of the remote devices;
mixing, by the leader device, the received audio data of the multiple remote devices; and
providing, by the leader device, the mixed audio data to the client device.

19. A device, comprising:
a receiver;
a transmitter; and
processing circuitry, wherein the device is configured to perform a method for establishing a teleconferencing system between two locations, the method comprising:
generating a first audio packet based on audio produced by an audio source;
obtaining a first metric for the first audio packet;
obtaining a second metric for a second audio packet generated by a client device based on the audio produced by the audio source;
determining which of (i) the first audio packet generated by the leader device and (ii) the second audio packet generated by the client device has a higher quality, wherein the determination is based on the first metric for the first audio packet and the second metric for the second audio packet; and
as a result of determining that the first audio packet has a higher quality than the second audio packet, transmitting to a third device the first audio packet, otherwise transmitting to the third device the second audio packet.

20. A non-transitory computer readable storage medium storing instructions for configuring a device comprising processing circuitry operable to execute the instructions to perform a method for establishing a teleconferencing system between two locations, the method comprising:

generating a first audio packet based on audio produced by an audio source;

obtaining a first metric for the first audio packet;

obtaining a second metric for a second audio packet generated by a client device based on the audio produced by the audio source;

determining which of (i) the first audio packet generated by the leader device and (ii) the second audio packet generated by the client device has a higher quality, wherein the determination is based on the first metric for the first audio packet and the second metric for the second audio packet; and as a result of determining that the first audio packet has a higher quality than the second audio packet, transmitting to a third device the first audio packet, otherwise transmitting to the third device the second audio packet.

\* \* \* \* \*